(12) United States Patent
Sharma et al.

(10) Patent No.: US 12,182,565 B2
(45) Date of Patent: *Dec. 31, 2024

(54) SYSTEMS AND METHODS FOR SAFE OVER-THE-AIR UPDATE OF ELECTRONIC CONTROL UNITS IN VEHICLES

(71) Applicant: Geotab Inc., Oakville (CA)

(72) Inventors: Puneet Sharma, Etobicoke (CA); William Keane Hickey, Oakville (CA); Artur Gyumushyan, Richmond Hill (CA); Patrick Wojcik, Cambridge (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,276

(22) Filed: Aug. 4, 2023

(65) Prior Publication Data
US 2023/0385049 A1    Nov. 30, 2023

Related U.S. Application Data

(63) Continuation of application No. 17/704,147, filed on Mar. 25, 2022, now Pat. No. 11,829,748.
(Continued)

(51) Int. Cl.
G06F 8/65      (2018.01)
B60W 50/06     (2006.01)

(52) U.S. Cl.
CPC ............... *G06F 8/65* (2013.01); *B60W 50/06* (2013.01); *B60W 2556/45* (2020.02)

(58) Field of Classification Search
CPC ...... G06F 8/65; B60W 50/06; B60W 2556/45; H04L 67/12; H04L 63/0492; H04L 67/34; H04W 4/80; H04W 4/44
See application file for complete search history.

(56) References Cited

U.S. PATENT DOCUMENTS

2005/0216903 A1     9/2005  Schaefer
2012/0258725 A1*   10/2012  Yi ........................... H04W 4/50
                                                        455/456.1
(Continued)

FOREIGN PATENT DOCUMENTS

CN      113243002 A     8/2021
JP      2020062936 A    4/2020

OTHER PUBLICATIONS

Anonymous: "Firmware—Wikipedia", Jun. 27, 2019 (Jun. 27, 2019), XP0055724627, Retrieved from the internet: URL: http://en.wikipedia.org/w/index.php?title=firmare&oldid=903663150 [retrieved on Aug. 24, 2020].
(Continued)

*Primary Examiner* — Richard M Camby
(74) *Attorney, Agent, or Firm* — Sherif A. Abdel-Kader

(57) ABSTRACT

Systems and method for safe over-the-air (OTA) update of electronic control units in vehicles are provided. The OTA server determines whether an operator terminal is close to a vehicle and if so, sends a request to the operator terminal requesting confirmation for proceeding with completing a firmware update for an electronic control unit in the vehicle. In response to receiving the confirmation, the OTA server sends a request to a telematics device coupled to the vehicle to complete the firmware update.

16 Claims, 27 Drawing Sheets

Related U.S. Application Data

(60) Provisional application No. 63/249,726, filed on Sep. 29, 2021.

(56) References Cited

U.S. PATENT DOCUMENTS

| | | |
|---|---|---|
| 2012/0323402 A1 | 12/2012 | Murakami |
| 2016/0147525 A1 | 5/2016 | Choi |
| 2016/0170775 A1 | 6/2016 | Rockwell |
| 2016/0196131 A1* | 7/2016 | Searle .................. H04L 65/40 717/173 |
| 2016/0196132 A1* | 7/2016 | Searle .................. H04L 9/40 717/173 |
| 2016/0203652 A1 | 7/2016 | Throop |
| 2016/0278064 A1 | 9/2016 | Marsh |
| 2017/0075678 A1 | 3/2017 | Kurosawa |
| 2017/0118023 A1 | 4/2017 | Gussen |
| 2017/0262277 A1 | 9/2017 | Endo |
| 2018/0189103 A1 | 7/2018 | Teshler |
| 2018/0192462 A1 | 7/2018 | Hu |
| 2018/0196656 A1 | 7/2018 | Miller |
| 2018/0232223 A1 | 8/2018 | Madrid |
| 2018/0293816 A1 | 10/2018 | Garrett |
| 2019/0075423 A1* | 3/2019 | Hrabak .................. H04W 76/14 |
| 2019/0143996 A1* | 5/2019 | Fawaz .................. B60W 50/00 701/36 |
| 2019/0354364 A1 | 11/2019 | Seki |
| 2020/0043250 A1 | 2/2020 | Maier |
| 2020/0114927 A1 | 4/2020 | Yokota |
| 2021/0056786 A1 | 2/2021 | De La Garza |

OTHER PUBLICATIONS

EESR dated Feb. 16, 2023, European Patent Office.

* cited by examiner

| Type 912 | Update Server Identifier 914 | Vehicle Identifier 916 |
|---|---|---|
| FIRMUPD_REG_REQ | <Telematics & OTA server ID> | VIN1 |

| ECM/ECU 922 | VIN 924 | Registration 926 | Update Server 928 |
|---|---|---|---|
|  |  |  |  |
|  |  |  |  |
| ECM_123 | VIN1 | No | --- |
| ECU_456 | VIN1 | No | --- |
| ECM_123 | VIN99 | No | --- |
|  |  |  |  |
|  |  |  |  |

| ECM/ECU 922 | VIN 924 | Registration 926 | Update Server 928 |
|---|---|---|---|
|  |  |  |  |
|  |  |  |  |
| ECM_123 | VIN1 | Yes | OTA update server 800 |
| ECU_456 | VIN1 | Yes | OTA update server 800 |
| ECM_123 | VIN99 | No | --- |
|  |  |  |  |
|  |  |  |  |

930

<firmware for ECM__123>
VIN1, VIN<x>, VIN<y>, ...

| Vehicle identifier 322 | Telematics device identifier 324 |
|---|---|
| VIN1 | TD00101 |
| VIN2 | TD00233 |
| VIN3 | TD00881 |

Figure 12

| Vehicle identifier 322 | Telematics device identifier 324 | Asset (vehicle) Location 326 |
|---|---|---|
| VIN1 | TD00101 | 45.5017° N, 73.5673° W |
| VIN2 | TD00233 | 43.6532° N, 79.3832° W |
| VIN3 | TD00881 | 49.2827° N, 123.1207° W |

340

| Vehicle identifier 322 | Operator Terminal 450 |
|---|---|
| VIN1 | OT0012 |
| VIN2 | OT0015 |
| VIN3 | OT0091 |

| Vehicle identifier 322 | Telematics device ID | Asset (vehicle) location 326 | Operator Terminal 450 |
|---|---|---|---|
| VIN1 | TD00101 | 45.5017° N, 73.5673° W | OT0012 |

SYSTEMS AND METHODS FOR SAFE OVER-THE-AIR UPDATE OF ELECTRONIC CONTROL UNITS IN VEHICLES

RELATED APPLICATIONS

This application is a continuation application of U.S. patent application Ser. No. 17/704,147, the contents of which are herein incorporated by reference in their entirety.

FIELD

The present disclosure relates generally to telematics, and more specifically to systems and methods for safe over-the-air update of electronic control units in vehicles.

BACKGROUND

A telematics system may gather asset data using a telematics device. The telematics device may be integrated into or located onboard the asset. The asset may be a vehicle ("vehicular asset') or some stationary equipment. The telematics device may collect the asset data from the asset through a data connection with the asset. In the case of a vehicular asset, the telematics device may gather the asset data through an onboard diagnostic port. The gathered asset data may include engine speed, battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure there is provided a method by an over-the-air (OTA) server. The method includes determining whether an operator terminal is in close proximity to a vehicle. In response to determining that the operator terminal is in close proximity to the vehicle the method further includes sending a request to the operator terminal requesting a confirmation for proceeding with completing a firmware update for an electronic control unit (ECU) deployed on the vehicle. In response to receiving the confirmation for proceeding with completing the firmware update, the method further includes sending a request to a telematics device coupled to the vehicle to complete the firmware update.

Completing a firmware update may comprise sending a firmware update to an ECU, and the firmware update may become a primary firmware of the ECU after being downloaded thereto.

Completing a firmware update may comprise sending a firmware activation command to an ECU, and the firmware activation command may cause a secondary firmware on the ECU to start executing.

Determining that the operator terminal is in close proximity to the vehicle may comprise determining that a distance between a location of the vehicle and a location of the operator terminal is below a particular threshold.

The method may further comprise receiving the location of the vehicle from a telematics server and receiving the location of the operator terminal from the operator terminal.

Determining that the operator terminal is in close proximity to the vehicle may comprise receiving an indication from the operator terminal that the operator terminal is connected with the telematics device coupled to the vehicle.

The operator terminal may be connected with the telematics device via a wired communications module or a wireless communications module.

Determining that the operator terminal is in close proximity to the vehicle may comprise receiving an indication from the operator terminal of a near-field communications (NFC) tap within a prior period of time.

The method may further comprise sending the firmware update to the telematics device.

The method may further comprise receiving a firmware update request from an Original Equipment Manufacturer (OEM) server including a firmware update and a list of vehicle identifiers.

In another aspect of the present disclosure, there is provided an over-the-air (OTA) update server comprising a controller, a network interface coupled to the controller, and a memory coupled to the controller. The memory stores machine-executable programming instructions which, when executed by the controller, configure the over-the-air (OTA) update server to determine whether an operator terminal is in close proximity to a vehicle, in response to determining that the operator terminal is in close proximity to the vehicle, send a request to the operator terminal requesting a confirmation for proceeding with activating a firmware update on the vehicle, and in response to receiving the confirmation for proceeding with activating the firmware update, send a firmware activation command to a telematics device coupled to the vehicle.

The machine-executable programming instructions which configure the OTA update server to determine whether an operator terminal is in close proximity to a vehicle may comprise machine-executable instructions which configure the OTA update server to determine that a distance between a location of the vehicle and a location of the operator terminal is below a particular threshold.

The machine-executable programming instructions may further configure the OTA update server to receive the location of the vehicle from a telematics server and receive the location of the operator terminal from the operator terminal.

The machine-executable programming instructions which configure the OTA update server to determine that the operator terminal is in close proximity to the vehicle may comprise machine-executable programming instructions which receive an indication from the operator terminal that the operator terminal is connected with the telematics device coupled to the vehicle.

The machine-executable programming instructions which configure the OTA update server to determine that the operator terminal is in close proximity to the vehicle may include machine-executable programming instructions which receive an indication from the operator terminal that the operator terminal is connected with the telematics device coupled to the vehicle.

The operator terminal may be connected with the telematics device via a wired communications module or a wireless communications module.

The machine-executable programming instructions which configure the OTA update server to determine that the operator terminal is in close proximity to the vehicle may include machine-executable programming instructions which receive an indication from the operator terminal of a near-field communications (NFC) tap within a prior period of time.

The machine-executable programming instructions may further configure the OTA update server to send the firmware update to the telematics device and receive to an indication of the firmware update download completion to the vehicle.

The machine-executable programming instructions may further configure the OTA update server to receive a firmware update request from an original equipment manufacturer (OEM) server including a firmware update and a list of vehicle identifiers In another aspect of the present disclosure, there is provided a non-transitory machine-readable storage medium storing machine-executable programming instructions that when executed by a controller cause the controller to determine whether an operator terminal is in close proximity to a vehicle, in response to determining that the operator terminal is in close proximity to the vehicle, send a request to the operator terminal requesting a confirmation for proceeding with activating a firmware update on the vehicle, and in response to receiving the confirmation for proceeding with activating the firmware update send a firmware activation command to a telematics device coupled to the vehicle.

In yet another aspect of the present disclosure, there is provided a method in an operator terminal. The method includes sending location information of the operator terminal to an over-the-air (OTA) update server. The method also includes receiving, from the OTA update server, a request to confirm whether a firmware update activation may be performed. The method also includes displaying a user interface including a firmware update activation user interface element. The method also includes sending an operator confirmation to the OTA update server in response to actuating a firmware update activation user interface element.

In yet another aspect of the present disclosure, there is provided an operator terminal. The operator terminal includes a controller, a network interface coupled to the controller; and a memory coupled to the controller. The memory stores machine-executable programming instructions which, when executed by the controller, configure the operator terminal to send location information of the operator terminal to an over-the-air (OTA) update server, and receive, from the OTA update server, a request to confirm whether a firmware update activation may be performed. The machine-executable programming instructions further configure the operator terminal to display a user interface including a user interface element for confirming the activation and send an operator confirmation to the OTA update server in response to the activation of the user interface element.

In yet another aspect of the present disclosure, there is provided a a non-transitory machine-readable storage medium storing machine-executable programming instructions that when executed cause a controller to send location information of an operator terminal to an over-the-air (OTA) update server, receive from the OTA update server a request to confirm whether a firmware update activation may be performed, display a user interface including a user interface element for confirming the activation, and send an operator confirmation to the OTA update server in response to the activation of the user interface element.

In a further aspect of the present disclosure, there is provided a method by an over-the-air (OTA) update server. The method includes requesting a vehicle's operating conditions from a telematics device coupled to the vehicle, receiving the vehicle's operating conditions from the telematics device, checking the vehicle's operating conditions to determine whether a firmware update on an electronic control unit (ECU) of the vehicle may be completed, and sending a firmware update or a firmware activation command to the telematics device for completing the firmware update when the vehicle's operating conditions allow the firmware update to be completed.

The method may include requesting, from a telematics server a telematics device identifier for the telematics device, and receiving from the telematics server, the telematics device identifier.

The vehicle's operating conditions may include one or more of: a vehicle's motion status, an engine running condition, a battery voltage, and an ignition status.

Sending a firmware update or a firmware activation command to the telematics device may only be done when there is adequate satellite and/or cellular coverage.

The firmware update sent when the vehicle's operating conditions allow the firmware update to complete may be for an ECU which activates the firmware updated upon download.

The firmware activation command sent when the vehicle's operating conditions allow the firmware update to complete may be for an ECU which has both a primary firmware and a secondary firmware and the firmware activation command may cause the secondary firmware to become active.

In yet another aspect of the present disclosure, there is provided an over-the-air update server. The over-the-air update server includes a controller; a network interface coupled to the controller; and a memory coupled to the controller. The memory stores machine-executable programming instructions which, when executed by the controller, cause the over-the-air update server to: request, over the network interface, a vehicle's operating conditions from a telematics device coupled to the vehicle. The machine-executable programming instructions further cause the over-the-air update server to receive over the network interface the vehicle's operating conditions from the telematics device, check the vehicle's operating conditions to determine whether a firmware update on an electronic control unit (ECU) of the vehicle may be completed, and send over the network interface a firmware update or a firmware activation command to the telematics device for completing the firmware update when the vehicle's operating conditions allow the firmware update to be completed.

The machine-executable programming instructions may further cause the over-the-air update server to request, from a telematics server a telematics device identifier for the telematics device and receive from the telematics server the telematics device identifier.

The vehicle's operating conditions may include one or more of: a vehicle's motion status, an engine running condition, a battery voltage, and an ignition status.

The machine-executable programming instructions may further cause the over-the-air update server to send a firmware update or a firmware activation command only send the firmware update or the firmware activation when there is adequate satellite and/or cellular coverage.

The firmware update sent when the vehicle's operating conditions allow the firmware update to complete may be for an ECU which activates the firmware updated upon download.

The firmware activation command sent when the vehicle's operating conditions allow the firmware update to complete may be for an ecu which has both a primary firmware and a secondary firmware and the firmware activation command may cause the secondary firmware to become active.

In yet a further aspect of the present disclosure, there is provided a non-transitory machine-readable storage medium storing machine-executable programming instructions that when executed cause a controller to request, over a network interface a vehicle's operating conditions from a telematics device coupled to the vehicle, receive, over the network interface the vehicle's operating conditions from the telematics device, check the vehicle's operating conditions to determine whether a firmware update on an electronic control unit (ecu) of the vehicle may be completed, and send over the network interface a firmware update or a firmware activation command to the telematics device for completing the firmware update when the vehicle's operating conditions allow the firmware update to be completed.

BRIEF DESCRIPTION OF THE DRAWINGS

Exemplary non-limiting embodiments of the present invention are described with reference to the accompanying drawings in which:

FIG. 11 depicts a firmware update packet sent from an OEM server to an OTA update server, in accordance with embodiments of the present disclosure;

FIG. 12 depicts an example database table in the telematics database correlating an asset and a telematics device coupled thereto, in accordance with embodiments of the present disclosure;

FIG. 16 is an example database table in the telematics database correlating an asset and its operator, in accordance with embodiments of the present disclosure;

DETAILED DESCRIPTION

Telematics System

Figure 1:
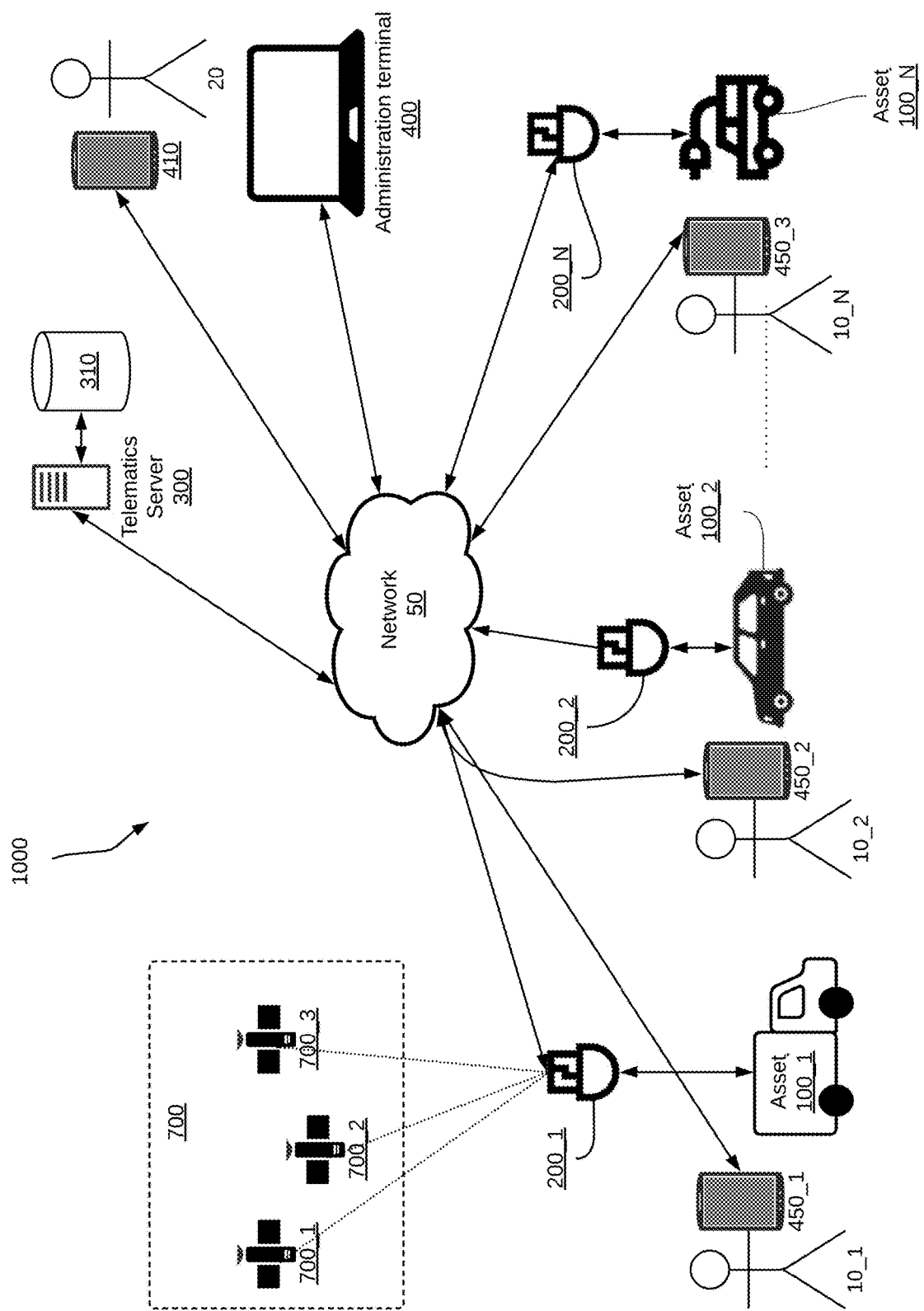
FIG. 1 is a schematic diagram of a telematics system including a plurality of telematics devices coupled to a plurality of assets.

A large telematics system may collect data from a high number of assets, either directly or through telematic devices. A telematics device may refer to a self-contained device installed at an asset, or a telematics device that is integrated into the asset itself. In either case, it may be said that data is being captured or gathered by the telematics device. FIG. 1 shows a high-level block diagram of a telematics system 1000. The telematics system 1000 includes a telematics server 300, (N) telematics devices shown as telematics device 200_1, telematics device 200_2 . . . through telematics device 200_N ("telematics device 200"), a network 50, administration terminals 400_1 and 400_2, and operator terminals 450_1, 450_2 . . . through 450_N ("operator terminals 450"). FIG. 1 also shows a plurality of (N) assets named as asset 100_1, asset 100_2 . . . asset 100_N ("asset 100") coupled to the telematics devices 200, and a plurality of satellites 700_1, 700_2 and 700_3 ("the satellites 700") in communication with the telematics devices 200.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). While the assets have been shown as vehicles, in some examples they may be airborne vehicles such as airplanes, helicopters, or drones. In other examples, the assets may be marine vehicles such as boats, ships, or submarines. In further examples, the assets may be stationary equipment such as industrial machines.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 300, and between the administration terminal 400 and the telematics server 300.

The telematics server 300 is an electronic device having the capability of storing and analyzing telematics data. The telematics server 300 is connected to the network 50 and may receive telematics data from the telematics devices 200. The telematics server may have a telematics database 310 for storing asset information related to the various assets 100. The asset information stored may include information about the user's currently operating a particular asset 100.

The satellites 700 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal is an electronic device, which may be used to connect to the telematics server 300 to retrieve data and analytics related to one or more assets 100. The administration terminal may be a desktop computer, a laptop computer such as the administration terminal 400, a tablet, or a smartphone such as the handheld administration terminal 410. The administration terminal 400 may run a web browser or a custom application which allows retrieving data and analytics, pertaining to one or more assets 100, from the telematics server 300 via a web interface of the telematics server. The handheld administration terminal 410 may run a mobile application for communicating with the telematics server 300, the mobile application allowing retrieving data and analytics therefrom. A fleet manager 20 may communicate with the telematics server 300 using the administration terminal 400 or the handheld administration terminal 410. In addition to retrieving data and analytics, the administration terminal allows the fleet manager 20 to set alerts and geofences for keeping track of the assets 100, receiving notifications of deliveries, and so on.

The operator terminals 450 are electronic devices, such as smartphones or tablets. The operator terminals 450 are used by operators 10 (for example, vehicle drivers) of the assets 100 to both track and configure the usage of assets in a group of assets. For example, as shown in FIG. 1, the operator 10_1 has the operator terminal 450_1, the operator 10_2 has the operator terminal 450_2, and the operator 10_N has the operator terminal 450_N. Assuming the operators 10 all belong to a fleet of vehicles, each of the operators 10 may operate any of the vehicle assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 450 are in communication with the telematics server 300 over the network 50. The operator terminals 450 may run at least one asset configuration application. The asset configuration application may be used by an operator 10 to inform the telematics server of the asset 100 the operator 10 is currently operating. For example, the operator 10_2 may use an asset configuration application on the operator terminal 450_2 to indicate that the operator 10_2 is currently using the asset 100_2. The telematics server 300 updates the telematics database 310 to indicate that the asset 100_2 is currently associated with the operator 10_2. Additionally, the asset configuration application may be used to report information related to the operation duration of the vehicle, the number of stops made by the operator during their working shift, and so on.

In operation, a telematics device 200 is coupled to an asset 100 to capture asset data. The asset data may be combined with location data obtained by the telematics device 200 from a location module in communication with the satellites 700 and/or sensor data gathered from sensors in the telematics device 200. The combined data may be termed "telematics data". The telematics device 200 sends the telematics data, to the telematics server 300 over the network 50. The telematics server 300 may process, aggregate, and analyze the telematics data to generate information about the assets 100 or a fleet of assets. The administration terminal 400 may connect to the telematics server 300, over the network 50, to access the generated information. Alternatively, the telematics server 300 may push the generated information to the administration terminal 400. Additionally, the operators 10, using their operator terminals 450, may indicate to the telematics server 300 which assets 100 they are associated with. The telematics server 300 updates the asset database accordingly. Furthermore, the telematics server 300 may provide additional analytics related to the asset operators including work time, location, and operating parameters. For example, for vehicle assets, the telematics data may include turning, speeding, and braking information. The telematics server 300 can correlate the telematics data to the vehicle's driver by querying the asset database 310. A fleet manager 20 may use the administration terminal to set alerts for certain activities pertaining to the assets 100. When criteria for an alert is met, the telematics server 300 sends a message to the fleet manager's administration terminal.

In the attached figures, a telematics device 200 is shown as a separate entity connected with a corresponding asset. It would be, however, apparent to those of skill in the art that other configurations are possible. For example, the telematics device 200 may be integrated with the asset 100 at the time of manufacturing. In other examples, the telematics device 200 may be deployed on an asset but not connected therewith. For example, a telematics device 200 may be deployed in a vehicular asset and may monitor the vehicle's engine temperature, location, speed, and direction of travel solely using sensors or peripherals on board the telematics device 200 such as a temperature sensor, a GPS receiver, an accelerometer, and a gyroscope.

Telematics Device

Figure 2:
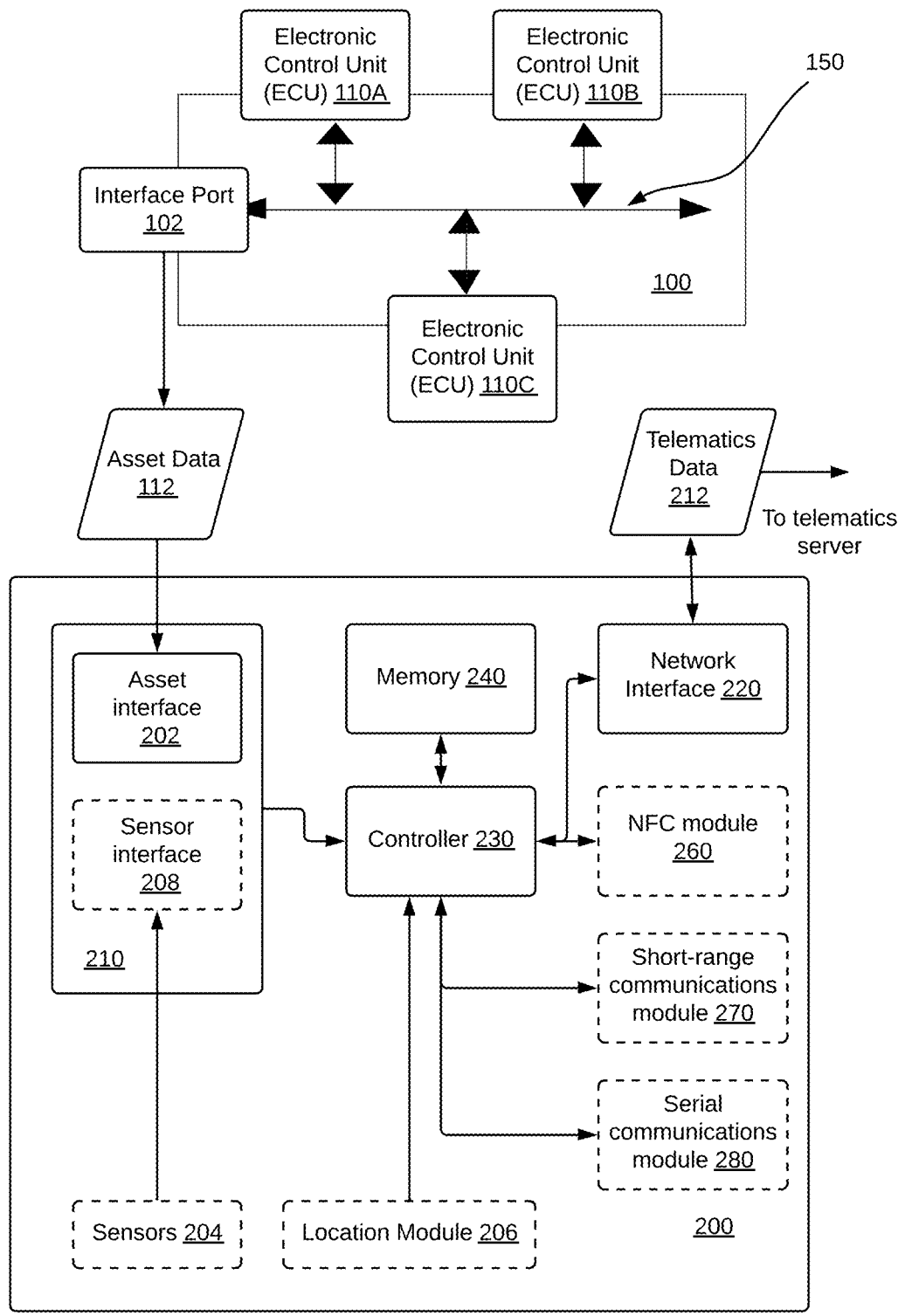
FIG. 2 is a block diagram showing a telematics device coupled to an asset.

Further details relating to the telematics device 200 and how it interfaces with an asset 100 are shown with reference to FIG. 2. FIG. 2 depicts an asset 100 and a telematics device 200 connected thereto. Selected relevant components of each of the asset 100 and the telematics device 200 are shown. For example, while the asset 100 may be a vehicular asset, only components relevant to gathering asset data are shown in FIG. 2.

The asset 100 may have a plurality of electronic control units (ECUs). An ECU is an electronic module which interfaces with one or more sensors for gathering information from the asset 100. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A typical vehicle may, for example, have around seventy ECUs. For simplicity, only a few of the ECUs 110 are depicted in FIG. 2. For example, in the depicted embodiment the asset 100 has three electronic control units: ECU 110A, ECU 110B, and ECU 110C ("ECUs 110"). The ECU 110A, the ECU 110B, and the ECU 110C are shown to be interconnected via a bus, such as a Controller Area Network (CAN) bus 150. ECUs 110 interconnected using a CAN bus send and receive information to one another in CAN frames by placing the information on the CAN bus 150. When an ECU places information on the CAN bus 150, other ECUs 110 receive the information and may or may not consume or use that information. Different protocols are used to exchange information between the ECUs over a CAN bus. For example, ECUs 110 in trucks and heavy vehicles use the Society of Automotive Engineering (SAE) J1939 protocol to exchange information over a CAN bus 150. Most passenger vehicles use the On-Board Diagnostic (OBD) protocol to exchange information between ECUs 110 on their CAN bus 150. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing power to a device connecting thereto.

The telematics device 200 includes a controller 230 coupled to a memory 240, an interface layer 210 and a network interface 220. The telematics device 200 also includes one or more sensors 204 and a location module 206 coupled to the interface layer 210, a near-field communications (NFC) module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100. The telematics device 200 shown is an example. Some of the depicted components may be optional and are depicted in dashed lines. For example, some telematics devices may not have a location module 206 and may rely on an external location module for obtaining location data. Some telematics devices may not have any sensors 204 and may rely on external sensors for obtaining sensor data. Some telematics devices 200 may not have an NFC module 260 or a short-range wireless communications module 270.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240. The memory 240 may contain machine-executable programming instructions, which when executed by the controller 230, configures the telematics device 200 for receiving asset data 112 from the asset 100 via the asset interface 202, and for receiving sensor data from the sensors 204 and/or location data from the location module 206 via the sensor interface 208. The memory 240 may also contain machine-executable programming instructions for combining asset data 112, sensor data and location data into telematics data 212. Additionally, the memory 240 may further contain instructions which, when executed by the controller 230, configures the telematics device 200 to transmit the telematics data 212 via the network interface 220 to a telematics server 300 over a network 50.

The location module 206 may be a global positioning system (GPS) transceiver or another type of location determination peripheral that may use, for example, wireless network information for location determination. The sensors 204 may be one or more of: a temperature sensor, a pressure sensor, an optical sensor, an accelerometer, a gyroscope, or any other suitable sensor indicating a condition pertaining to the asset 100 to which the telematics device 200 is coupled.

The interface layer 210 includes an asset interface 202 and a sensor interface 208. The sensor interface 208 is configured for receiving sensor data and location data from the sensors 204 and the location module 206, respectively. For example, the sensor interface 208 interfaces with the location module 206 and with the sensors 204 and receives both sensor data and location data, respectively, therefrom. The interface layer 210 also includes an asset interface 202 to receive asset data 112 from the asset 100. In the depicted embodiment, the asset interface 202 is coupled to the interface port 102 of the asset 100. In other embodiments where the telematics device 200 is integrated into the asset 100, the asset interface 202 may receive the asset data 112 directly from the CAN bus 150. The asset data 112, received at the telematics device 200, from the asset 100 may be in the form of data messages, such as CAN frames. Asset data 112 may describe one or more of any of: a property, a state, and an operating condition of the asset 100. For example, where the asset 100 is a vehicle, the data may describe the speed at which the vehicle is travelling, a state of the vehicle (off, idle, or running), or an engine operating condition (e.g., engine oil temperature, engine RPM, or a battery voltage). In addition to receiving the asset data 112, in some embodiments the asset interface 202 may also receive power from the asset 100 via the interface port 102. The interface layer 210 is coupled to the controller 230 and provides the asset data 112, sensor data, and location data to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for a telematics service or other purposes. The network interface 220 may also be used to receive instructions from the telematics server 300 as to how to communicate with the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The read information from the NFC tag may be included in the telematics data 212 sent by the telematics device 200 to the telematics server 300.

The short-range wireless communications module 270 is a component intended for providing short-range communication capability to the telematics device 200. The short-range wireless communications module 270 may be a Bluetooth™, wireless fidelity (Wi-Fi), Zigbee™, or any other short-range communications module. The short-range wireless communications module 270 allows other devices to communicate with the telematics device 200 over a short-range wireless network.

The serial communications module 280 is an example of a wired communications module. The serial communications module 280 is an electronic peripheral for providing standard serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit (I²C) bus. As another example, the serial communications module 280 may include a universal serial bus (USB) transceiver.

In operation, an ECU 110, such as the ECU 110A, the ECU 110B, or the ECU 110C communicates asset data over the CAN bus 150. The asset data exchanged, between the ECUs 110, over the CAN bus 150 are accessible via the interface port 102 and may be retrieved as the asset data 112 by the telematics device 200. The controller 230 of the telematics device 200 receives the asset data 112 via the asset interface 202. The controller 230 may also receive sensor data from the sensor 204 and/or location data from the location module 206 over the sensor interface 208. The controller 230 combines the asset data 112 with the sensor data and the location data to provide the telematics data 212. The controller 230 transmits the telematics data 212 to the telematics server 300 over the network 50 via the network interface 220. The telematics server 300 may perform data analytics on the telematics data 212. A fleet manager may use the administration terminal 400 or the handheld administration terminal 410 to run reports or gather information from the telematics server 300. Optionally, an asset operator may tap an NFC tag to the NFC module 260 to identify themselves as the operator of the asset 100. Additionally, an external peripheral, such as a GPS receiver, may connect with the telematics device 200 via the short-range wireless communications module 270 for providing location information thereto.

While asset data 112 gathered from the asset 100 combined with data obtained from the sensors 204 and the location module 206 may be used to derive useful data and analytics, there are times when additional data, which is not provided by the asset 100 or the peripherals on board the telematics device 200, may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity features.

Input/Output Expander

To capture and provide information not provided by the asset 100 or the telematics device 200; to produce an output, or to perform an action, which is not supported by the telematics device 200, the telematics device 200 may be modified to allow an input/output expander device ("I/O expander") to connect thereto, as shown in FIG. 3. The I/O expander 500 may be an input device configured to capture additional data such as video frames, audio frames, or proprietary signals and provide that data to the telematics device 200. Alternatively, or additionally, the I/O expander 500 may be configured as an output device and may include a display for displaying information and/or an audio output device for broadcasting messages pertaining to the asset 100.

The I/O expander 500 of FIG. 3 is an example I/O expander which is designed to provide additional connectivity options to a telematics device 200. For example, the telematics device 200 shown in FIG. 3 does not have an NFC module, a short-range communications module, or a serial communications module. Instead, the telematics device 200 has an I/O expander interface 250.

Figure 3A:
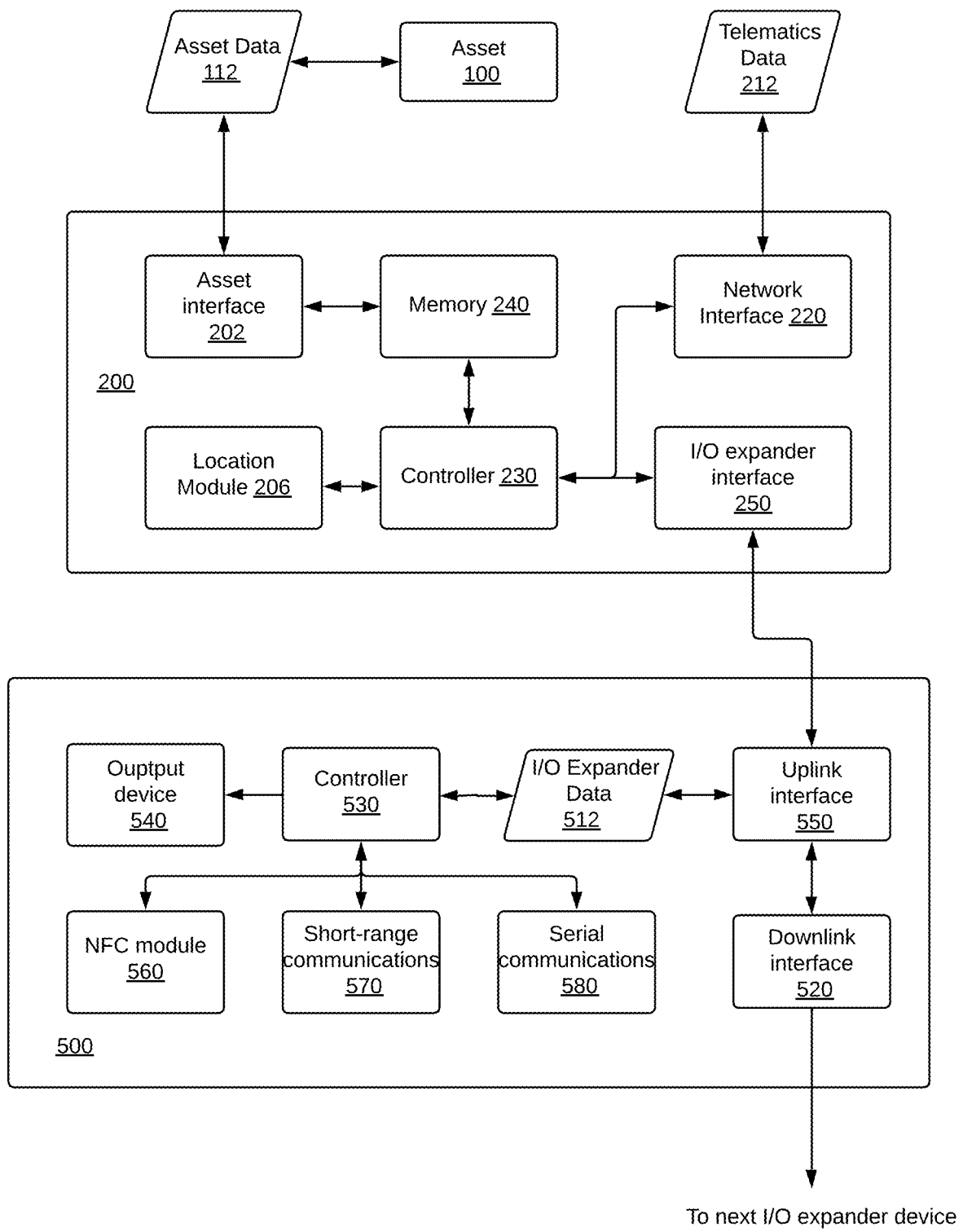
FIG. 3A is a block diagram showing a telematics device coupled to an asset and to an input/output (I/O) expander.
Figure 3B:
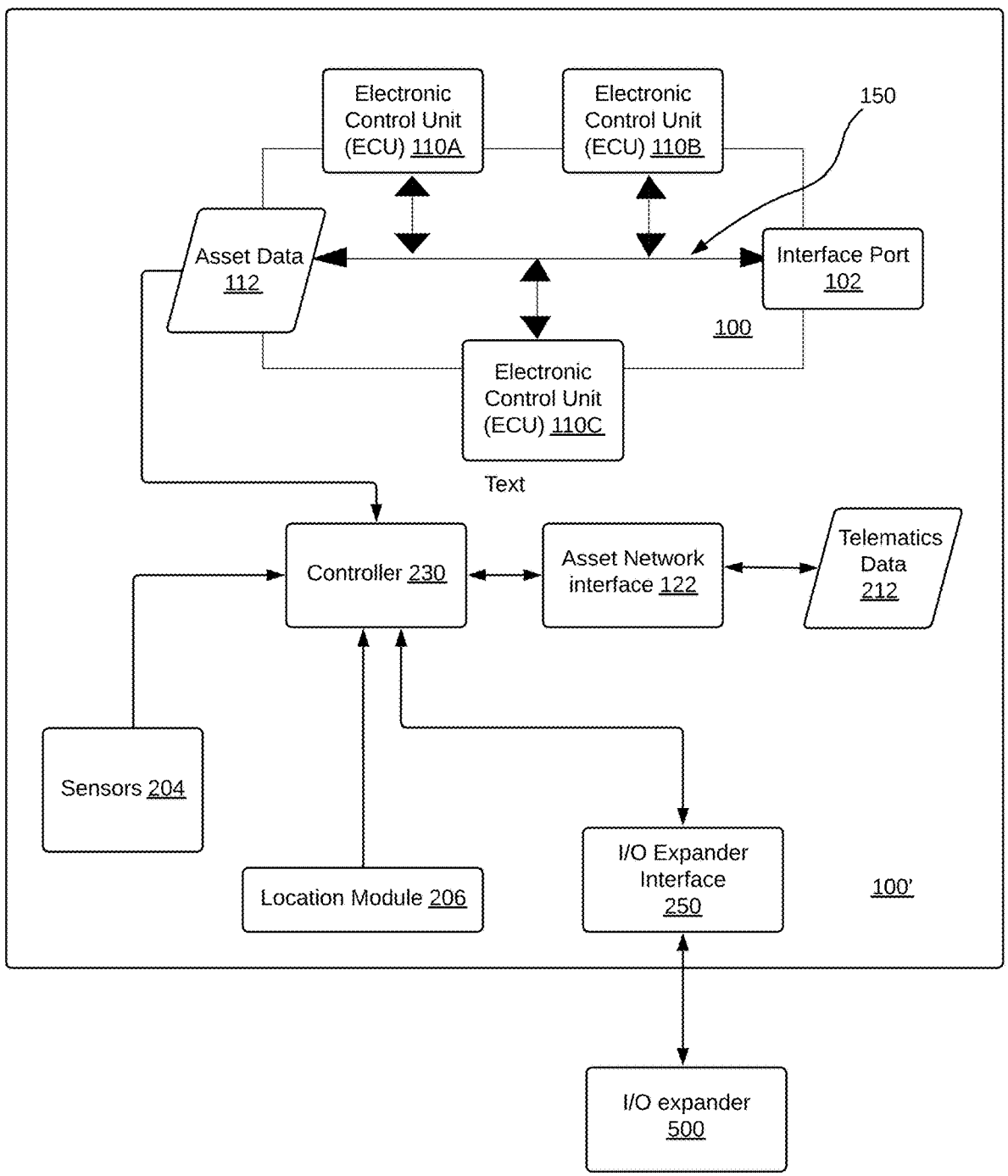
FIG. 3B is a block diagram showing an asset having a telematics device integrated therein and I/O expander coupled thereto.

FIG. 3A depicts an asset 100, a telematics device 200 coupled to the asset 100, and an I/O expander 500 coupled to the telematics device 200. The asset 100 is similar to the asset 100 of FIG. 2 and therefore the internal components thereof are not shown in FIG. 3A for simplicity. The telematics device 200 has a somewhat similar configuration as the telematics device 200 of FIG. 2 but adds an I/O expander interface 250 for interfacing with the I/O expander 500. The I/O expander interface 250 is coupled to the controller 230 and may be configured for exchanging I/O expander data 512 with the I/O expander 500.

An I/O expander 500, which connects with the telematics device 200, varies in complexity depending on the purpose thereof. FIG. 3A shows an I/O expander 500 containing several components which may or may not all be present in other I/O expanders. For example, the I/O expander 500 includes a controller 530, an NFC module 260, an output device 540, a short-range communications module 570, a serial communications module 580, an uplink interface 550 and a downlink interface 520.

The controller 530 may be similar to the controller 230. In some embodiments, the controller 530 is a microcontroller with versatile I/O capabilities. For example, the controller 530 may be a microcontroller which has a plurality of I/O ports such as general-purpose inputs and outputs (GPIOs), serial ports, analog inputs, and the like. In some embodiments, the controller 530 may have built-in persistent memory such as flash memory on which machine-executable programming instructions for carrying out the functionality of the I/O expander 500 may be stored. In other embodiments, the controller 530 may be coupled to a persistent memory module (not shown) that contains the machine-executable programming instructions for carrying out the functionality of the I/O expander 500. The controller 530 may also have built-in volatile memory, such as random-access memory (RAM) for storing data. Alternatively, the I/O expander 500 may be connected to an external volatile memory for storing data. The controller 530 may execute the machine-executable programming instructions stored in the persistent memory to carry out the functionality of the I/O expander 500.

The output device 540 receives data from the controller 530 and performs an output function. For example, the output device 540 may include a display for displaying information received from the controller 530. As another example, the output device 540 may include a speech synthesizer and a speaker for displaying audible information received from the controller 530. As yet another example, the output device 540 may be an output interface to a hardware device. For example, the output device 540 may be a motor controller that interfaces to an electric motor.

The NFC module 560, short-range communications module 570, and the serial communications module 580 are similar to the NFC module 260, short-range wireless communications module 270, and the serial communications module 280 described above with reference to FIG. 2.

The uplink interface 550 is an electronic peripheral interface coupled to the controller 530 and is used to provide data exchange and/or power capabilities to the I/O expander 500. The uplink interface 550 allows the I/O expander 500 to transmit and receive I/O expander data. The uplink interface 550 is configured to use the same protocol and signaling as the I/O expander interface 250 of the telematics device 200. Accordingly, the I/O expander 500 may exchange the I/O expander data with the telematics device 200. In some embodiments, the uplink interface 550 may also include power pins connected to corresponding power pins in the I/O expander interface 250, thus allowing the I/O expander 500 to be powered via the telematics device 200. In other embodiments (not shown), the I/O expander 500 may have its own power source instead of or in addition to the power provided by the telematics device 200 via the uplink interface 550.

The downlink interface 520 is an electronic peripheral interface coupled to the uplink interface 550. The downlink interface 520 is configured to interface with the uplink interface 550 of another I/O expander 500 (as will be described below). Allowing the uplink interface 550 to connect to the downlink interface 520 of another I/O expander 500 allows the daisy chaining of I/O expanders 500.

Figure 4A:
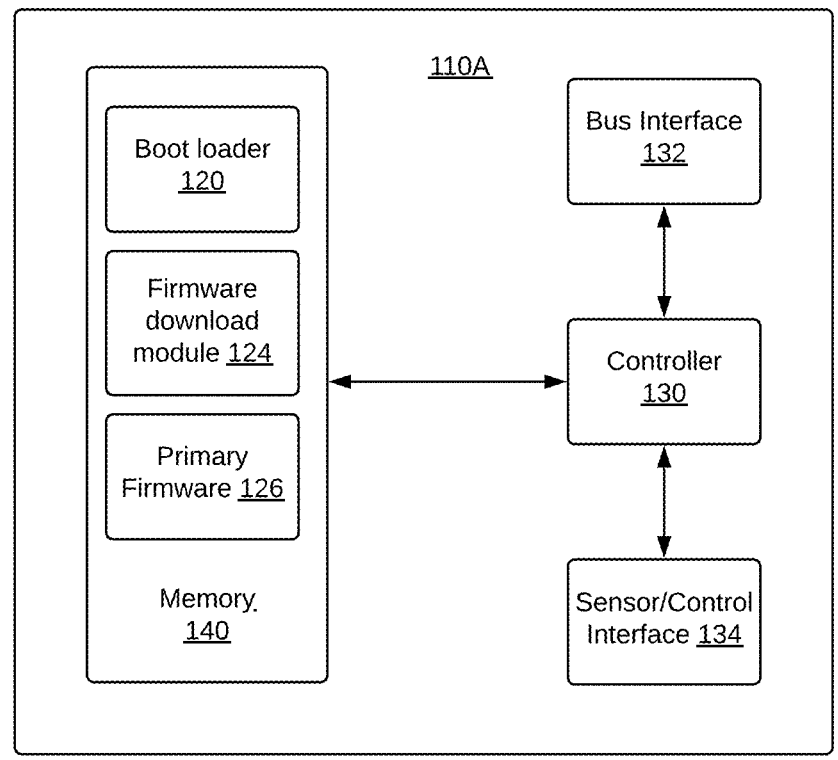
FIG. 4A is a block diagram of an exemplary electronic control unit (ECU) deployed in vehicles.
Figure 4B:
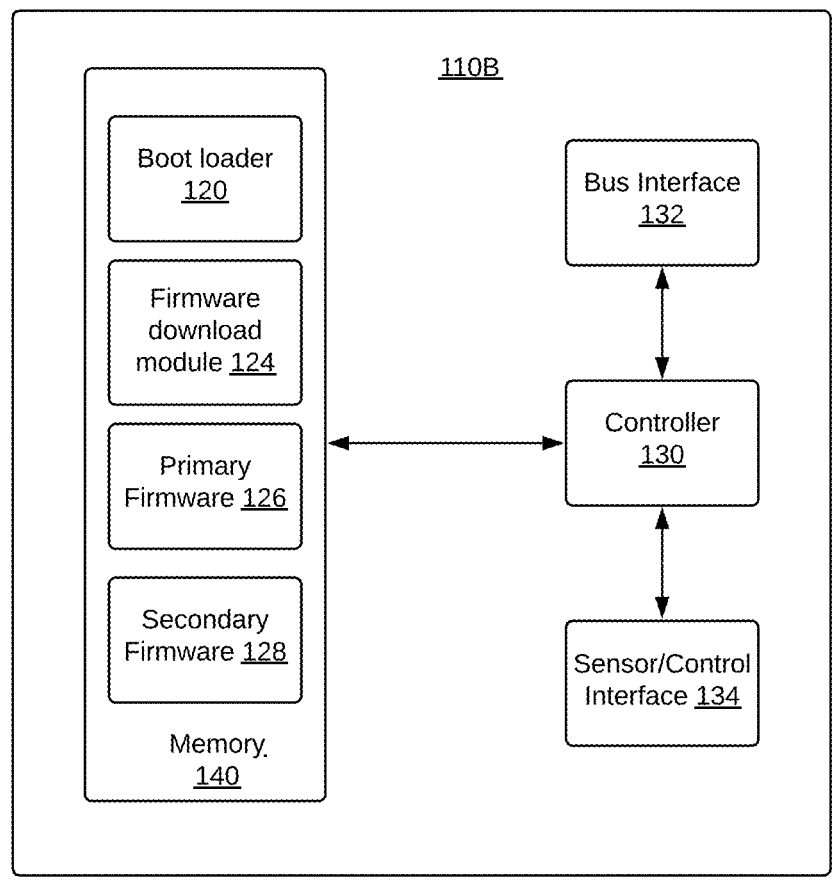
FIG. 4B is a block diagram of another exemplary ECU deployed in vehicles.

An ECU 110 may belong to one of many types. For example, an ECU may be an engine control module (ECM), a powertrain control module (PCM), a transmission control module (TCM), and so on. Accordingly, some ECUs are associated with other subsystems of a vehicle asset. For example, an ECM is associated and is generally provided by the original equipment manufacturer (OEM) of a vehicle's engine. An ECU typically contains a controller, memory, a bus interface and one or more sensor/control interface. A simplified representation of an ECU 110 is shown in FIGS. 4A and 4B.

Integrated Telematics Device

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 3B, there is shown an asset 100' with the components of a telematics device integrated therein, in accordance with embodiments of the present disclosure. The asset 100' is similar to the asset 100 but, being a connected asset such as a connected car, it has an asset network interface 122 built into it. In the depicted embodiment, the telematics device controller 230 is directly connected to the asset communications bus, which is a CAN bus 150 and may directly obtain the asset data 112 therefrom. The sensors 204 and the location module 206 are also integrated into the asset 100 and provide the sensor data and the location data to the telematics device controller 230 as described above. The asset network interface 122 belongs to the asset 100' and may be used by the asset 100 to communicate with an original equipment manufacturer (OEM) server, to a roadside assistance server, or for other purposes. The telematics device controller 230 may utilize the asset network interface 122 for the transmission of telematics data 212 provided by the telematics device controller 230. In order to support gathering data types not provided by the integrated peripherals such as the sensors 204 and the location module 206, the asset 100' has an I/O expander interface 250 coupled to the telematics device controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

ECU with Single Firmware

First with reference to FIG. 4A, a block diagram of an ECU 110A is shown. The ECU 110A is comprised of a controller 130, a memory 140, a bus interface 132, and a sensor/control interface 134.

The controller 130 is similar to the controller 230 described above. The controller 130 executes machine-executable programming instructions stored in the memory 140.

The bus interface 132 is a hardware peripheral which connects the ECU 110A to a vehicle bus, such as the CAN bus 150. Asset data exchanged over the CAN bus 150 can be accessed by the ECU 110A over the bus interface 132.

The sensor/control interface 134 connects the ECU 110A to one or more sensors and/or hardware subsystems. For example, the ECU 110A may report the engine temperature in which case the sensor/control interface 134 may connect the ECU 110A to a temperature sensor. Output signals generated by the sensor are available as input signals on the sensor/control interface 134. As another example, the ECUA may control a hardware subsystem such as the headlights. In which case the sensor/control interface 134 may interface to an electronic relay or similar device for actuating the hardware subsystem. The ECU 110A outputs signals on the sensor/control interface 134 for controlling the hardware subsystem connected to the sensor/control interface 134.

The memory 140 stores a number of software modules each comprised of a plurality of machine-executable programming instructions. In the depicted embodiment, the memory 140 stores a boot loader 120, a firmware download module 124, and a primary firmware 126.

The primary firmware 126 performs the main functions of the ECU 110A. For example, if the ECU 110A mainly obtains information from sensors, the primary firmware 126 may interpret input signals received, from one or more sensors, over the sensor/control interface 134. If the ECU 110A controls a hardware subsystem in the vehicle, then the primary firmware 126 generates output signals on the sensor/control interface 134 for controlling the hardware subsystem connected thereto. A firmware update may be used to add additional functions to the ECU 110A, enhance its performance, or fix problems.

The boot loader 120 is the first module that is executed by the controller 130 when the ECU 110A is powered-up. The boot loader 120 causes the controller 130 to execute the primary firmware 126.

The firmware download module 124 downloads the new versions of the firmware (i.e., firmware updates). The firmware download module 124 stores the firmware update as the primary firmware 126, and causes the ECU 110A to be rebooted so that the boot loader 120 causes the controller 130 to execute the firmware update (now stored as the primary firmware 126).

In operation, when the ECU 110A is powered up the controller 130 executes the boot loader 120. The boot loader 120 starts executing the primary firmware 126. The primary firmware 126 may detect an indication that a new firmware update is available for download. The indication that a new version of the firmware is available for download may be a byte pattern or a packet with a particular type received over the bus interface 132. In response to detecting the indication, the primary firmware 126 may invoke the firmware download module 124. The firmware download module 124 may start downloading the new firmware into the memory 240 replacing the primary firmware 126. At the end of the firmware update download, the firmware download module 124 causes the ECU 110A to be reset (rebooted). Upon resetting, the controller 130 executes the boot loader 120 which, in turn, executes the primary firmware 126 which has been updated with the new firmware update.

ECU with Primary and Secondary Firmware

FIG. 4B depicts another example of an ECU 110B having both a primary firmware 126 and a secondary firmware 128 placeholders in the memory 140 thereof. The secondary firmware 128 is similar to the primary firmware 126 but is a placeholder for testing a new version of the firmware such as a firmware update.

The firmware download module 124 downloads the new versions of the firmware and stores the newly downloaded versions of the firmware into the secondary firmware 128. The firmware download module 124 may also set a flag indicating whether the primary firmware 126 or the secondary firmware 128 should run by default, may check for an indication that the newly downloaded firmware should be the default firmware, and may replace the primary firmware 126 with the secondary firmware 128 as will be explained below.

In operation, when the ECU 110B is powered up the controller 130 executes the boot loader 120. In some embodiments, the boot loader checks a new firmware flag. The new firmware flag indicates whether new firmware has been downloaded as the secondary firmware 128. If the new firmware flag is set, the boot loader 120 may start executing the secondary firmware 128. If the new firmware flag is not set, the boot loader 120 may start executing the primary firmware 126. As discussed above, the primary firmware 126 may detect an indication that a new version of the firmware is available for download and invoke the firmware download module 124. The firmware download module 124 may start downloading the firmware update and store the firmware update as the secondary firmware 128. The ECU 110B continues to execute the primary firmware 126 until the new firmware is activated. The firmware download module 124 may monitor the bus interface 132 waiting for an activation command of the newly downloaded firmware. In some embodiments, in response to receiving an activation command on the bus interface 132, the firmware download module 124 sets a new firmware flag indicating that the newly downloaded firmware stored as the secondary firmware 128 should be activated. In some embodiments, upon receipt of the firmware activation command, the firmware download module 124 may trigger a power cycling or reset (reboot) of the ECU 110B.

On power-up or reset of the ECU 110B, the boot loader 120 checks the new firmware flag and determines that a new firmware has been downloaded as the secondary firmware 128. In response to determining that a new firmware has been downloaded as the secondary firmware, the boot loader 120 executes the secondary firmware 128. In some embodiments, the secondary firmware 128, during execution, checks for an indication or a command that indicates whether the secondary firmware 128 should become the primary firmware 126. For example, when a new firmware is downloaded and stored as the secondary firmware 128, the ECU 110B may be tested in this mode. If it is determined that the secondary firmware 128 is working properly, a command may be sent to the ECU 110B to make the secondary firmware 128 the primary firmware 126. In response to receiving the command, secondary firmware 128 transfers control to the firmware download module 124 along with an indication that the secondary firmware 128 has been verified and is to become the primary firmware 126. In some embodiments, in response to receiving the indication, the firmware download module 124 copies the secondary firmware 128 onto the primary firmware 126, clears the new firmware flag, and resets the ECU. In other embodiments, the secondary firmware 128 becomes the default firmware and a new firmware update is downloaded as the primary firmware 126.

When the ECU 110B is reset, the boot loader 120 determines that the new firmware flag is clear and executes the primary firmware 126. The placeholder for the secondary firmware 128 is available for downloading a new firmware update in the future.

Handheld Firmware Programming Unit

Figure 5:
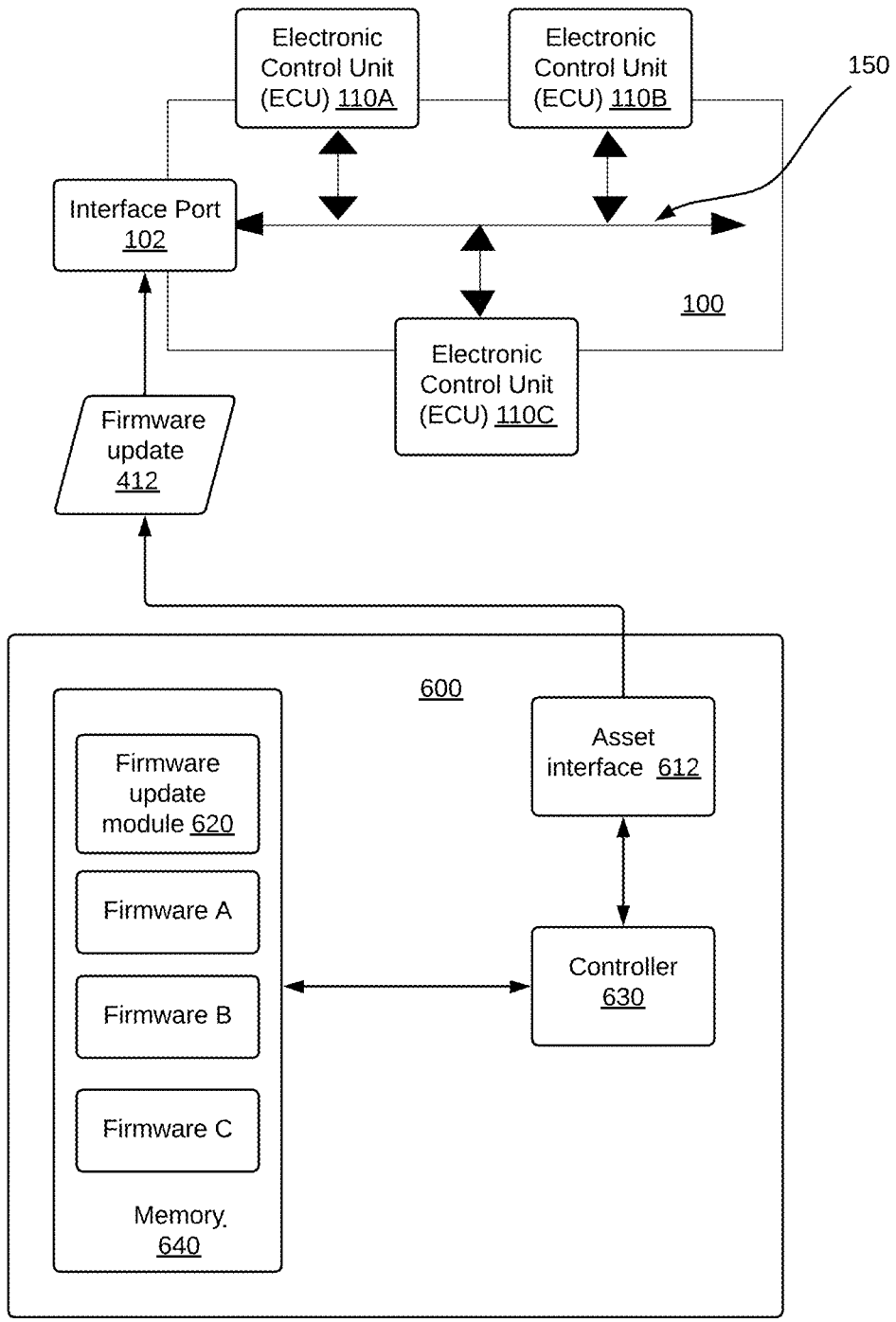
FIG. 5 is a block diagram showing a telematics device coupled to a vehicular asset and to a firmware programming unit.

Updating the ECUs 110 in a vehicle may be done by a handheld firmware programming unit. For example, a firmware programming unit 600 is shown in FIG. 5 connected to an interface port 102 of an asset 100 for providing firmware update to the ECUs of the asset 100. The firmware programming unit includes a controller 630, a memory 640, and an asset interface 612.

The controller 630 may be similar to the controller 230, the asset interface 612 is similar to the asset interface 202 of the telematics device 200, and the memory 640 is similar to the memory 240 of the telematics device 200. The memory 240 contains a firmware update module 620 which includes machine-executable programming instructions which, when executed by the controller 630, configure the firmware programming unit 600 to upload a firmware update 412 for one or more of the ECUs 110 of the asset 100. For example, the memory 640 contains Firmware A for ECU 110A, Firmware B for the ECU 110B, and Firmware C for ECU 110C. The firmware programming unit 600 may upload the Firmware A, Firmware B, and/or Firmware C over the asset interface 612 for programming the ECUs 110A, 110B and 110C, respectively. Each firmware update 412 may be encapsulated in at least one packet or frame including a header identifying the ECU to which the respective firmware is to be uploaded. The firmware programming unit 600 is also configured to allow sending an activation command to an ECU which causes the ECU to execute the newly downloaded firmware as its default firmware.

While updating ECU firmware in a vehicle using a firmware programming unit 600 is possible, the process has many problems. For starters, the firmware programming unit 600 needs to be loaded with firmware for different ECUs. Additionally, OEMs determine when firmware in their respective ECUs need to be updated. Different OEMs will send firmware updates for their respective ECUs at different time thus requiring that vehicles be updated a number of times making the use of a firmware programming unit 600 tedious. A fleet of vehicles would need to repeat the firmware update process for all vehicles in the fleet which is a laborious process.

Telematics System with Over-The-Air (OTA) Update Capability

Figure 6:
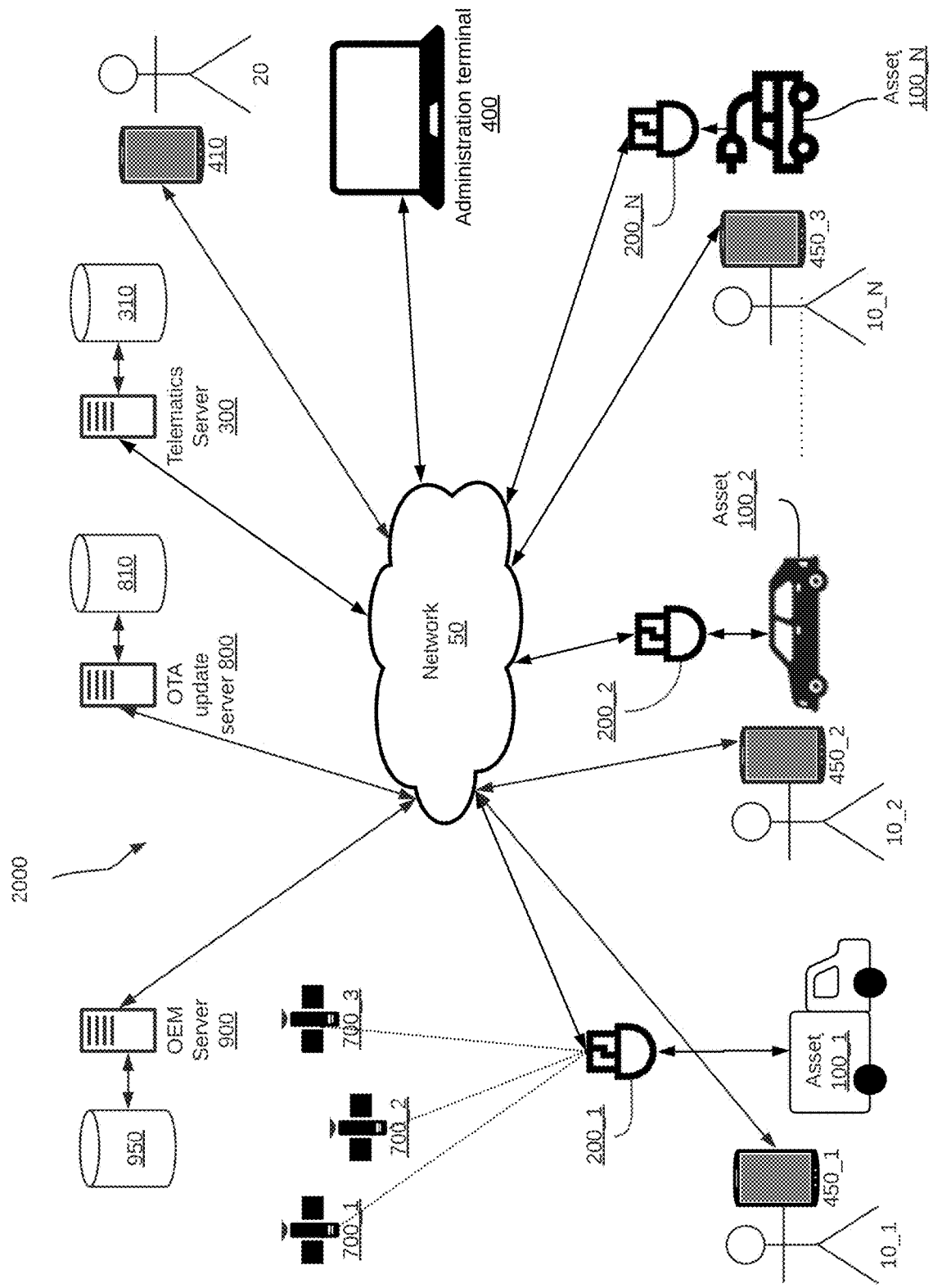
FIG. 6 is a schematic diagram of a telematics system configured for providing over-the-air (OTA) updates, in accordance with embodiments of the present disclosure.

The telematics system 1000 shown in FIG. 1 presents a suitable solution for updating vehicle ECUs in a seamless manner. FIG. 6 shows a modified telematics system 2000 in which an OEM server 900 and an OTA update server 800 have been integrated into the telematics system 1000 for providing firmware updates to their respective ECUs.

The telematics system 2000 is similar to the telematics system 1000 of FIG. 1 in some respects and therefore some of the components will not be described again in detail.

The OEM server 900 is operated by an OEM that manufactures ECUs and holds firmware updates for one or more ECU types deployed in the field. The OEM server 900 includes or is coupled to an OEM database 950. The OEM database 950 keeps track of the different types of ECUs made by the OEM and whether firmware updates are available for each of the ECU types. The OEM server 900 is accessible by a fleet manager 20 via the administration terminal 400 or the handheld administration terminal 410. Additionally, the OEM server 900 may include a web portal which is accessible from any web browser. The OEM server 900 may receive requests from a fleet manager 20 to receive firmware updates for ECUs deployed in a fleet's assets 100. The OEM server 900 may prepare the firmware updates for the respective ECUs and send them to another server, such as the OTA update server 800, for delivery to the respective assets 100, as will be described below.

The OTA update server 800 may be operated by the same entity as the telematics server 300, namely a telematics and asset tracking solutions provider. The OTA update server 800 is in communication with the OEM server 900 for receiving firmware updates for various ECUs. The OTA update server 800 is also in communication with a plurality of telematics devices 200 deployed in a plurality of assets 100. Accordingly, the OTA update server 800 may send ECU firmware updates received from the OEM server 900 to a plurality of telematics devices 200 for downloading into the ECUs of the respective assets 100 to which the telematics devices 200 are connected.

While FIG. 6 shows the telematics server 300 and the OTA update server 800 as separate servers, they may be integrated into a single server. For example, the OTA update functionality may be built into the telematics server 300 and the database 810 may be accessible from the telematics server 300.

Firmware Update Registration

The telematics system 2000 of FIG. 6 can be used to provide ECU firmware updates to one or more vehicle assets 100 belonging to a fleet of vehicle assets. In order to receive ECU firmware updates, a fleet manager 20 may first register with an OEM that manufactures vehicle components and request to receive ECU firmware updates for the ECUs of the vehicle components made by the OEM. For example, an engine manufacturer may receive a request from a customer, such as a fleet owner or a fleet manager, to receive updates of firmware for Engine Control Modules (ECMs) made by the OEM. AN ECM is a type of ECU specific to engine control. The OEM can utilize the telematics system 2000 to deliver the ECU (in this case ECM) firmware update to the respective vehicles as will be described below. At first, a registration process 1100 described in FIG. 7 is carried out.

Figures 7, 8:
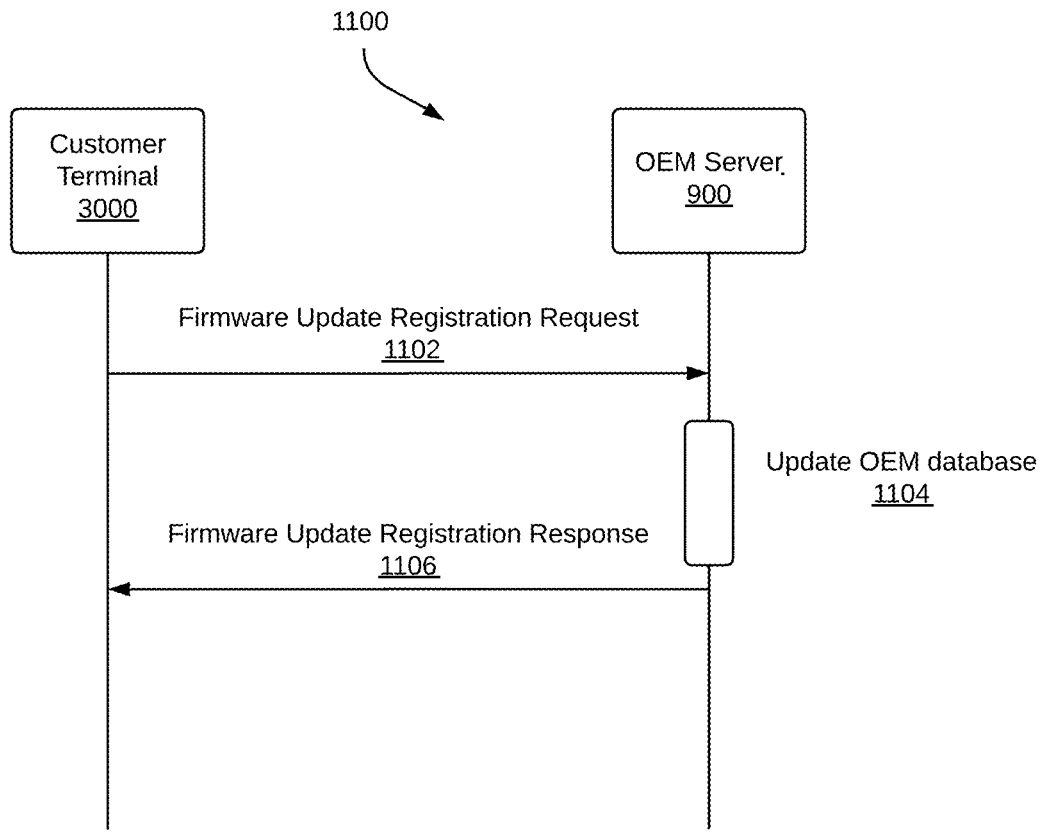
FIG. 7 is a message sequence diagram for a firmware update (FIRMUPD) registration process, in accordance with embodiments of the present disclosure.
FIG. 8 depicts a FIRMUPD registration request packet, in accordance with embodiments of the present disclosure.

FIG. 7 outlines the exchanges between a customer terminal 3000, and an OEM server 900 for registering a customer's vehicles for firmware updates with the OEM. The OEM server 900 has been discussed above. The customer terminal 3000 may, for example, be the administration terminal 400 or the handheld administration terminal 410.

At step 1102 a customer that owns one or more vehicles sends a firmware update registration request from the customer terminal 3000 to the OEM server 900. The OEM server 900 receives the firmware update registration request. In some embodiments, the firmware update registration request of step 1102 identifies the update server (e.g., the OTA update server 800) of the telematics provider that the customer is using for their vehicle. An exemplary firmware update registration request 910 is shown in FIG. 8. The firmware update registration request 910 includes a type 912, an update server identifier 914, and a vehicle identifier 916.

The type 912 is set to FIRMUPD_REG_REQ indicating to the OEM server 900 that the customer wishes to register for firmware updates for the vehicle specified by the vehicle identifier 916.

The update server identifier 914 specifies the server which can receive firmware updates from the OEM server 900 and can send the firmware updates to the respective ECUs as described further below. The update server identifier 914 may be a Universal Resource Locator (URL), an Internet Protocol (IP) address, or any other suitable identifier that allows the OEM server 900 to communicate therewith. In some embodiments, the update server identifier 914 may refer to the telematics server 300 to which a telematics device 200 deployed in the vehicle designated by the vehicle identifier 916 is connected. As discussed above, in some embodiments, the OTA update server 800 may be integrated into the telematics server 300. In other embodiments, the telematics server 300 and the OTA update server 800 are distinct servers, and the update server identifier 914 refers to the OTA update server 800. In further embodiments, the update server identifier 914 may refer to the telematics server 300 which may be configured as a proxy for the OTA update server 800. In such embodiments, when a firmware update is sent by the OEM server 900 to the telematics server 300, the telematics server 300 is configured to forward the firmware update to the OTA update server 800.

The vehicle identifier 916 is a unique identifier that identifies a vehicle in which ECUs for which firmware updates are being registered for are installed. The vehicle identifier enables the OEM server 900 to determine the ECM/ECUs installed in the vehicle. As an example, the vehicle identifier 916 may be a VIN such as "VIN1". VINs are usually comprised of a long sequence of letter and numbers. For simplicity, in this disclosure we use easy-to-read values such as "VIN1".

Figure 9A:
FIG. 9A depicts a simplified database table of an Original Equipment Manufacturer (OEM) database depicting entries prior to a FIRMUPD registration request, in accordance with embodiments of the present disclosure.
Figure 9B:
FIG. 9B depicts the simplified database table of FIG. 9A after being updated based on a FIRMUPD registration request, in accordance with embodiments of the present disclosure.

Turning back to FIG. 7, at step 1104, the OEM server 900 processes the firmware update registration request 910. The OEM server 900 queries the OEM database 950 for the vehicle identified by the firmware update registration request 910. For example, with reference to the example of FIG. 8, the OEM server 900 queries the OEM data base for a vehicle identifier equal to "VIN1". An example of a database table 920 of the OEM database 950 is shown in FIG. 9A and FIG. 9B. Each row or tuple of the database table 920 is comprised of at least four fields: the ECM/ECU field 922, the VIN field 924, the registration field 926, and the update server field 928.

The ECM/ECU field 922 contains an identifier for an ECU or ECM model, made by the OEM, and installed in the vehicle identified by the VIN stored in the VIN field 924. There may be more than one ECU or ECM made by the OEM installed in the vehicle designated by the vehicle identifier stored in the VIN field 924.

The VIN field 924 stores a vehicle identifier, such as a VIN for a vehicle in which one or more ECUs made by the OEM are installed. Accordingly, as seen in the database table 920, "VIN1" has multiple entries (rows or tuples) in the database table 920 each representing a different ECU associated with the vehicle represented by the vehicle identifier "VIN1".

The registration field 926 is a flag indicating whether the vehicle designated by the VIN stored in the VIN field 924 is registered to receive firmware updates for the ECM/ECU field 922. When a vehicle, designated by a VIN stored in a VIN field 924, is not registered to receive an update for an ECM/ECU specified in the ECM/ECU field 922, the value of the registration field 926 is "No". Conversely, upon successful registration of the vehicle to receive a firmware update for an ECM/ECU deployed therein, the value of the registration field 926 is set to "Yes".

The update server field 928 stores an identifier for the update server to use to send firmware updates to the vehicle specified in the VIN field 924. The update server field 928 uses the same specifier format as the update server identifier 914 of the firmware update registration request 910.

Turning back to step 1104 in FIG. 7, the OEM server 900 searches the OEM database 950, and specifically the database table 920 for entries corresponding to the vehicle identifier 916 specified in the firmware update registration request. With reference to FIG. 9A, there are two entries corresponding to "VIN1", which is the vehicle identifier specified in the firmware update registration request 910 of FIG. 8. FIG. 9A shows that the vehicle designated by "VIN1" is not registered for firmware updates either for the ECM designated as ECM_123 or the ECU designated as ECU_456. This is represented by a "No" in the registration field 926 and also by the update server field 928 being blank or null. In response to receiving the firmware update registration request of FIG. 8, the OEM server 900 updates both entries in the database table 920 which correspond to "VIN1" to indicate that the vehicle represented by "VIN1" is registered for firmware updates that become available for the ECM model ECM_123 and the ECU model ECU_456. The OEM server 900 also updates the update server field 928 with an identifier of the OTA update server 800 to indicate that firmware updates for the vehicle "VIN1" are to be delivered to the OTA update server 800 when available.

At step 1106 of FIG. 7, the OEM server 900 sends back a firmware update registration response to the customer terminal 3000. The firmware update registration response may contain a status code that indicates to the customer terminal 3000 whether the firmware update registration request is successful or not.

After the firmware update registration is completed for a particular vehicle's ECUs, whenever a firmware update is available for one or more of the particular vehicle's ECUs, the OEM server 900 may push the firmware update to an update server stored in the update server field 928, such as the OTA update server 800. This is described in more detail with reference to FIG. 10A and FIG. 10B.

ECU Firmware Update

Figure 10A:
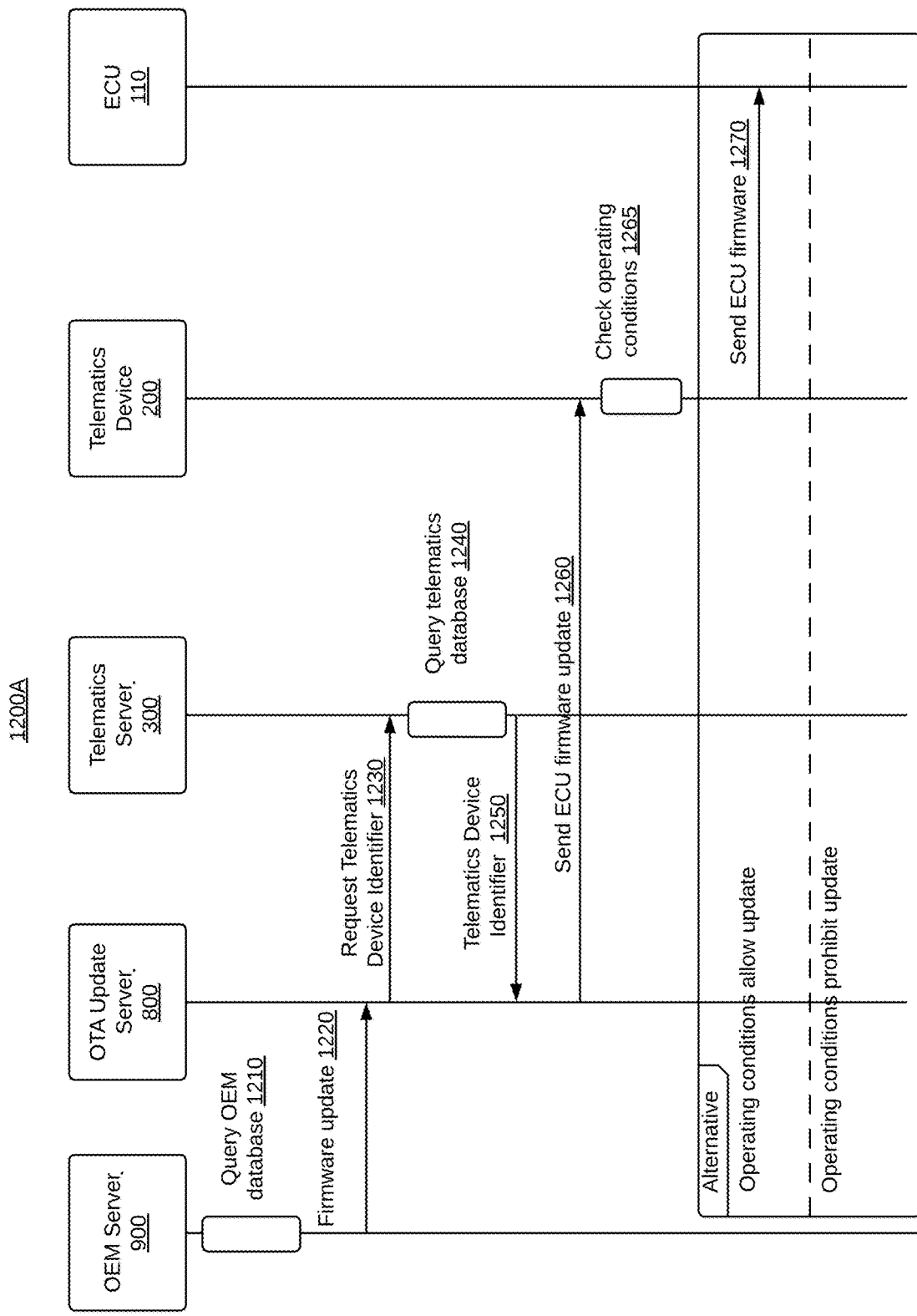
FIG. 10A is a message sequence diagram showing steps of an ECU firmware update process, in accordance with embodiments of the present disclosure.

FIG. 10A depicts a method 1200A for updating an ECU 110 deployed in a vehicle asset, in accordance with embodiments of the present disclosure. The method 1200A assumes that the registration process 1100 of FIG. 7 has been executed and that the OTA update server 800 has registered for firmware updates with the OEM server 900. It is also assumed that the OEM server 900 now has a firmware update for an ECU deployed in one or more vehicle assets registered for firmware updates.

At step 1210, the OEM server 900 has a new firmware update for an ECU. The OEM server 900 needs to determine how to deliver the firmware update to vehicles which are registered for firmware updates. The OEM server 900 queries the OEM database 950 and particularly the database table 920. As an example, the firmware update may be for an ECM model type "ECM_123". Upon querying the table 920, the OEM server 900 determines that the vehicles "VIN1" and "VIN99" both have the ECM of type "ECM_123" deployed therein. However, the OEM server 900 also determines that the vehicle "VIN99" is not registered for firmware updates as indicated by the value "No" in the registration field 926 corresponding thereto. Accordingly, the OEM server 900 determines that it needs to send the firmware update for ECM_123 to the vehicle "VIN1". The OEM server 900 checks the update server field 928 corresponding to the row for ECM_123 and VIN1 and determines that the firmware update for the ECM_123 can be delivered to the vehicle VIN1 via the OTA update server 800.

Based on the determination made in step 1210, at step 1220, the OEM server sends a firmware update message (for "ECM_123") to the OTA update server 800. The firmware update message includes both an ECU firmware update and a list of vehicle identifiers associated with the OTA update server 800 and which are to receive the ECU firmware update. For example, FIG. 11 shows a firmware update message 930 including the ECU firmware update for ECM_123 accompanied by a list of vehicle identifiers including "VIN1".

At step 1230, the OTA update server 800 needs to identify the telematics device 200 associated with each of the VINs specified in FIG. 11, including "VIN1". The OTA update server 800 sends a request for the telematics device identifier of the telematics device 200 coupled with the vehicle asset having a vehicle identifier specified in the firmware update message 930. For example, the OTA update server 800 may request the telematics device identifier of the telematics device coupled to the vehicle having the vehicle identifier "VIN1". The request is received at the telematics server 300.

At step 1240, in response to receiving the request for the telematics device identifier corresponding to a vehicle asset, such as "VIN1", the telematics server 300 queries the telematics database 310. Specifically, and with reference to FIG. 12, the telematics server 300 locates the entry, in the table 320, which corresponds to "VIN1" and contains "VIN1" in the vehicle identifier field 322. The telematics server 300 then determines that the telematics device identifier 324 of the telematics device coupled to the vehicle "VIN1" is "TD00101".

At step 1250, the telematics server 300 sends the telematics device identifier 324 back to the OTA update server 800. For example, for the vehicle "VIN1", the corresponding telematics device ID 324 has the value "TD00101".

It should be noted that, in another embodiment, the steps 1230, 1240, and 1250 may be performed before the method 1200A is started and as part of a registration process, such as the registration process 1100 of FIG. 7. For example, after step 1106 of FIG. 7, the customer terminal 3000 may send the list of vehicle identifiers for which the firmware update registration has been completed to the OTA update server 800. In turn the OTA update server 800 may perform steps 1230, 1240 and 1250 of FIG. 12 and maintain a table of the vehicle identifiers and corresponding telematics device identifiers.

The OTA update server 800 and the telematics device 200 are configured to communicate with one another using a networking protocol. Now the OTA update server 800 has been provided with the telematics device identifier 324 for the telematics device coupled to the vehicle identified by "VIN1" in step 1250. At step 1260, the OTA update server 800 sends an ECU firmware update for an ECU installed in the vehicle identified by the vehicle identifier "VIN1" to the telematics device coupled thereto. For example, at step 1260, the OTA update server 800 may send the ECU firmware update for ECM_123 to the telematics device 200 having a telematics ID "TD00101". The telematics device 200 may receive the ECU firmware update, such as the firmware update for ECM_123 over the network interface 220.

At this point, the telematics device 200 may send the ECU firmware update to the ECU 110. For example, the memory 240 of the telematics device 200 may contain machine-executable programming instructions which when executed by the controller 230 configure the telematics device 200 to send the ECU firmware, such as the firmware for ECM_123, over the asset interface 202 to the interface port 102 of the asset 100. For example, to send the ECU firmware for ECM_123 to the vehicle having the identification "VIN1", the firmware update is placed on the CAN bus 150 of the vehicle asset 100, where it is received by the ECU 110 (ECM_123) for which the firmware update is designated. Specific protocols and services are used for an ECU firmware update, such as the unified diagnostic services (UDS) protocol.

In case of the ECU 110 configuration of FIG. 4A, where the ECU 110 has only a primary firmware 126, downloading the firmware update to the ECU 110 will cause the ECU 110 to replace the existing primary firmware 126 with the firmware update and will cause the ECU 110 to reset. If the vehicle is operating while the firmware update is taking place, the vehicle operation may be disrupted, and unforeseen dangerous situations may occur. Accordingly, a number of conditions have been identified for a safe OTA firmware upgrade. For example, it is safer if the firmware update is completed when: 1) the vehicle is stopped or stationary, 2) the parking brake is engaged (if available), 3) the battery is connected and the ignition is on, 4) the engine is off, i.e. the RPM is 0, the battery voltage is adequate, 6) cellular/satellite coverage is adequate (i.e. the signal strength is strong enough for reliable communications), and 7) the driver is close to the vehicle. As such, at step 1265, the telematics device 200 queries a number of ECUs 110 in the vehicle and confirms that aforementioned conditions have been satisfied.

If the operating conditions of the vehicle permit completion of the firmware update, then at step 1270, the telematics device 200 sends the ECU firmware update to the ECU 110 as described above. On the other hand, if the operating conditions prohibit the upgrade, then the firmware update is not sent to the ECU 110. The telematics device 200 may cache the firmware update and retry at another time.

Figure 10B:
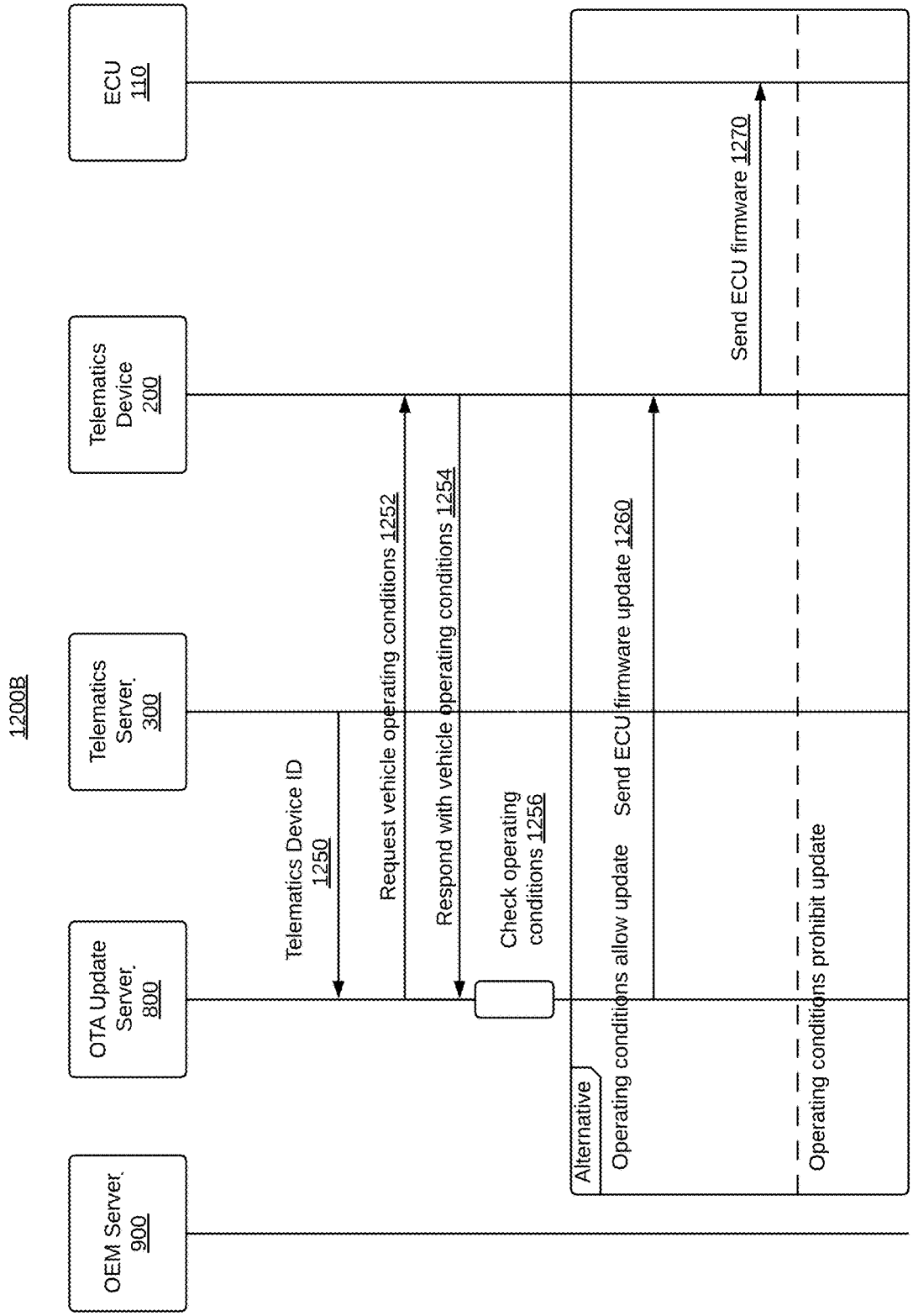
FIG. 10B is a message sequence diagram showing steps of another ECU firmware update process, in accordance with other embodiments of the present disclosure.

In another embodiment of FIG. 10A, shown in FIG. 10B the OTA update server 800 checks the conditions of the vehicle before sending the ECU firmware update to the telematics device 200 in step 1260. FIG. 10B depicts a method 1200B which is a variation of the method 1200A of FIG. 10A. Figure shows steps 1250 and up due to space limitations. It is assumed that the steps 1210-1240 of FIG. 10A have been performed. At step 1250, the OTA update server 800 receives the telematics device identifier coupled to the vehicle from the telematics server as described above.

At step 1252, the OTA update server 800 requests the vehicle operating conditions from the telematics device 200.

At step 1254, the telematics device 200 sends the vehicle operating conditions back to the OTA update server 800. The OTA update server 800 receives the vehicle operating conditions.

At step 1256, the OTA update server 800 checks the operating conditions of the vehicle.

If the operating conditions allow the update, then at step 1260 the OTA update server 800 sends the firmware update to the telematics device 200. Then, at step 1270 the telematics device 200 acts as a pass-through device and sends the ECU firmware update to the ECU 110. As described above with reference to FIG. 4A, a firmware update to the ECU 110 triggers a reset and the execution of the new firmware update as the primary firmware 126. In other words, the ECU is updated upon download of the firmware update.

In case of the ECU 110 configuration of FIG. 4B, where the ECU 110 has both a primary firmware 126 and a secondary firmware 128, the ECU firmware update is downloaded into the secondary firmware 128 without checking the vehicle conditions. This is because the ECU 110 will continue to run the primary firmware 126 until an activation command is received by the ECU 110 from the telematics device 200. In such embodiments, the step 1265 of FIG. 10A and the steps 1252, 1254, and 1256 of FIG. 10B are skipped. Instead, a separate activation process is used to activate the secondary firmware 128 as will be described below.

After the method 1200A or the method 1200B is executed, the firmware update for the ECU, such as ECM_123 is stored as the secondary firmware 128. The firmware update, however, is not activated and does not become the currently executing firmware as the ECU continues to execute the primary firmware 126. To activate the newly downloaded firmware update, the telematics device 200 needs to send an activation command to the ECU 110. As discussed above with reference to FIG. 4, the activation command causes the ECU to execute the secondary firmware 128 which now contains the firmware update. The activation command is only sent after the vehicle's operating conditions are deemed safe as discussed above. For example, it is safer if the ECU switches from executing the primary firmware 126 to the secondary firmware 128 (containing the new firmware update), when: 1) the vehicle's motion status is stopped or stationary, 2) the parking brake is engaged (if available), 3) the battery is connected and the ignition is on, 4) the engine is off (i.e. the RPM is), 5) the battery voltage is adequate, 6) cellular/satellite coverage is adequate, and 7) the driver is close to the vehicle.

Some or all of the above conditions need to be met to ensure that the firmware activation may not cause any problems that would render the vehicle unsafe or inoperable. As discussed above, in order for the firmware to be activated, the ECU needs to be rebooted. This means that the ECU would be inoperable for a certain duration. Depending on the function of the ECU, rebooting the ECU may cause a vehicle's engine to stall, may affect steering, may affect braking, or may affect any other essential function of the vehicle. Accordingly, activating an ECU firmware while the vehicle is in motion is considered unsafe. Similarly, activating an ECU firmware while the parking brake is not engaged may not guard against an unpredicted movement of the vehicle upon rebooting the ECU. When activating the firmware update, it is desired to ensure that the battery is connected, that ignition is on, and that the battery voltage is adequate. Since activating the firmware may entail copying the firmware update as the primary firmware, if there is insufficient battery power, the ECU may stop working before the firmware update has been copied as the primary firmware. A partially copied firmware would be inoperable thus making the ECU defective. Ensuring there is enough cellular and satellite coverage is another condition. If the satellite coverage is weak, then the location module may not accurately indicate whether the vehicle is stationary or in motion.

Some of the aforementioned conditions can be determined by the telematics device 200 from the vehicle asset 100, while others cannot. A telematics device 200 which contains accelerometers and/or a location module can determine whether the vehicle asset containing the ECU for which the firmware is to be activated is stationary. The telematics device 200 may thus contain machine-executable programming instructions which when executed by the controller 230 configure the telematics device 200 to read inertial measurement unit (IMU) data from the accelerometers to determine whether the vehicle asset is stationary. Additionally, machine-executable instructions may configure the telematics device 200 to continually read the device's location as reported by the location module 206 and determine if the vehicle is stopped or in motion. If the vehicle is not stationary and/or in motion, then the telematics device 200 refrains from sending an activation command causing the firmware update for the ECU to be activated.

In some embodiments, the vehicle's operating conditions may be available via the interface port 102 either periodically or upon request. For example, the vehicle may periodically report the status of the parking brake, battery voltage, and ignition status on the CAN bus 150. As another example, the telematics device 200 may send commands requesting the status of the parking brake, the battery voltage, and the ignition. In response to the commands, the respective ECUs place such information on the CAN bus which is accessible through the interface port 102. The telematics device 200 may read these statuses and refrain from sending an activation command to the ECU until all the aforementioned conditions are satisfied. This is described with reference to FIG. 13A below.

Figure 13A:
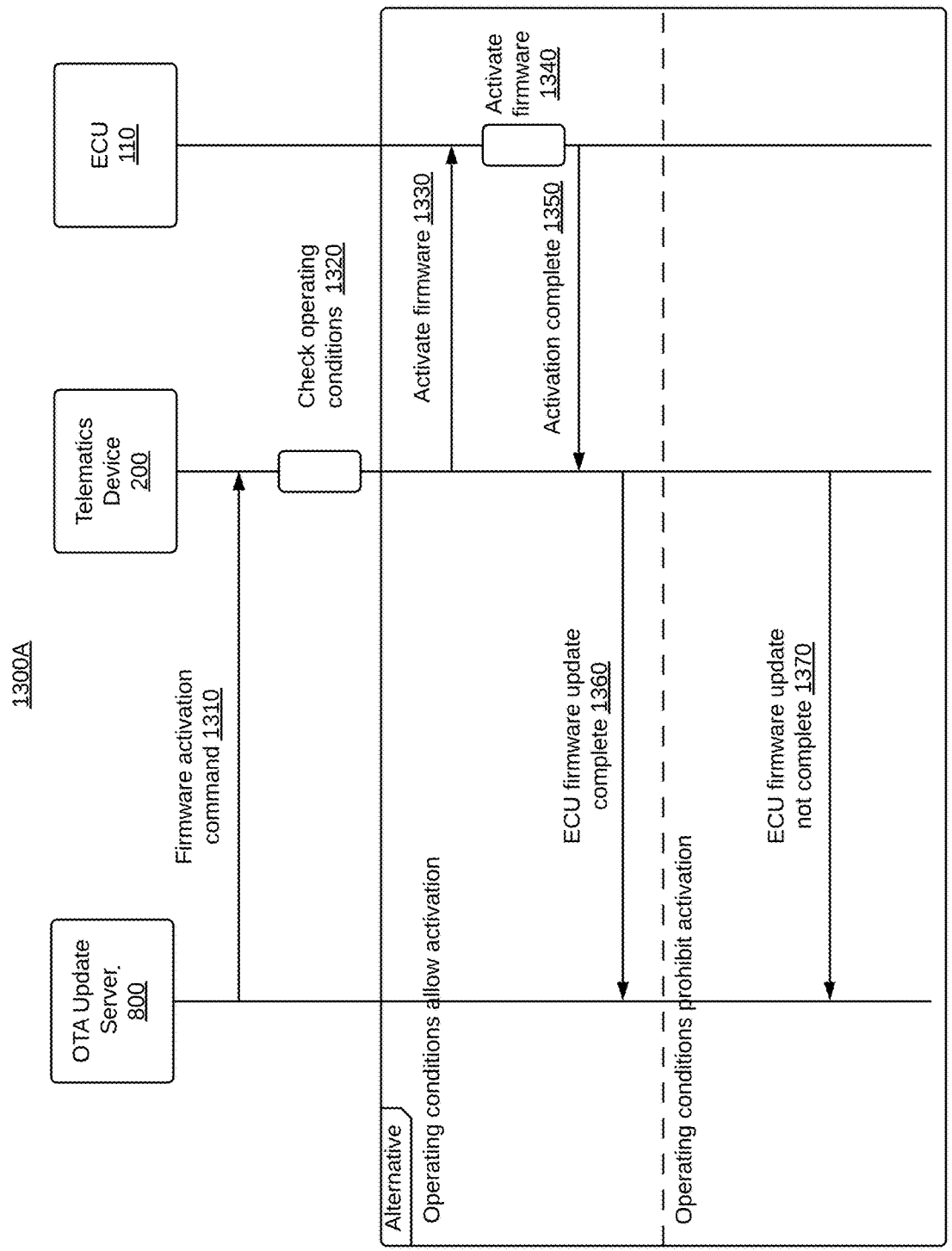
FIG. 13A is a sequence diagram depicting an activation method for an ECU firmware update, in accordance with embodiments of the present disclosure.
Figure 13B:
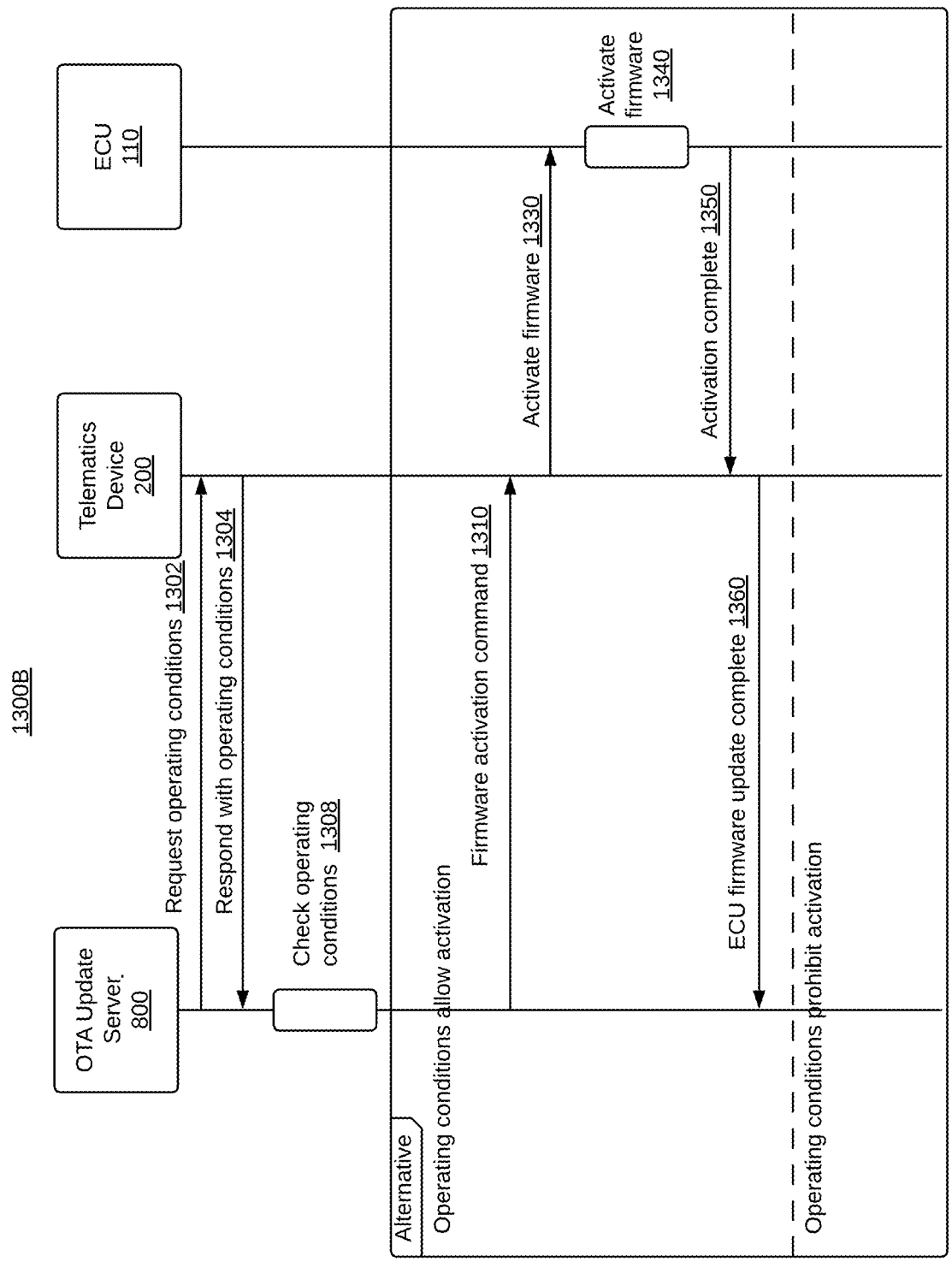
FIG. 13B is a sequence diagram depicting another activation method for an ECU firmware update, in accordance with other embodiments of the present disclosure.

FIGS. 13A and 13B each depicts a method of activating a firmware update in an ECU 110 having both a primary firmware 126 and a secondary firmware 128, in accordance with embodiments of the present disclosure. The method 1300A (or the method 1300B) may be executed after a firmware update has been downloaded into the secondary memory of an ECU 110 such as the ECU 110 of FIG. 4B.

First, with reference to FIG. 13A, there is shown a method 1300A for activating a firmware update in which a telematics device 200 checks the operating conditions of the vehicle before sending a firmware activation command to an ECU deployed in the vehicle.

At step 1310, the OTA update server 800 sends a firmware activation command to the telematics device 200. The firmware activation command instructs the telematics device 200 to attempt to activate the newly downloaded firmware update for an ECU. For example, the firmware activation command may instruct the telematics device 200 to activate the firmware update for the ECU "ECM_123" on the vehicle identified by "VIN1" which is coupled to the telematics device 200.

At step 1320, the telematics device 200 checks the vehicle's operating conditions to ascertain whether the vehicle's operating conditions allow the update to the ECU firmware to be completed. The update to the ECU firmware is completed when the newly downloaded firmware update to the ECU becomes the currently running (active) firmware. The operating conditions that would allow an update to be completed are that the vehicle is stopped and stationary, the engine is not running, the ignition is on, the battery voltage is sufficient, and the parking brake is engaged.

If the vehicle operating conditions allow the firmware update to be completed then steps 1330, 1340, 1350 and 1360, are performed. If, on the other hand, at least one vehicle operating condition would prohibit the completion of the firmware update, then step 1370 is performed.

At step 1330, the telematics device 200 sends a command, via the asset interface 202 and the interface port 102, to the ECU ("ECM_123") which has the newly downloaded firmware update to activate the newly downloaded firmware update.

At step 1340, the ECU activates the firmware update, which is stored as the secondary firmware 128. Activating the firmware update may involve setting a flag indicating that the secondary firmware is to become the active firmware and rebooting the ECU so that the boot loader executes the secondary firmware after rebooting.

At step 1350, upon completion of the activation of the firmware update, the ECU 110 sends an activation complete message to the telematics device 200 confirming that the firmware update is now the active firmware running thereon.

At step 1360, and in response to receiving the activation completion message from the ECU, the telematics device 200 sends an ECU firmware update completion message back to the OTA update server 800. The OTA update server 800 may update its database 810 to indicate the new firmware version that the ECU ("ECM_123") on the vehicle "VIN1" is currently running.

At step 1370, and in response to determining that the vehicle operating conditions would prohibit the completion of the firmware update on an ECU, the telematics device 200 sends an ECU firmware update not completed message to the OTA update server 800. In response to the ECU firmware update not completed message, the OTA update server 800 may retry sending the firmware activation command (sent at the step 1310) at a later time.

FIG. 13B depicts a method 1300B which is a variation on the method 1300A in which the OTA update server 800 checks and verifies the vehicle's operating conditions before proceeding with activating an ECU firmware update.

The method 1300B of FIG. 13B starts at step 1302. At step 1302, the OTA update server requests the relevant vehicle operating conditions from the telematics device 200. The telematics device 200 receives the request for the operating conditions. The telematics device 200 may query the various ECUs 110 on the vehicle.

At step 1304, the telematics device 200 sends a response to the OTA update server 800 with the vehicle's operating conditions. The OTA update server 800 receives the response.

At step 1308, the OTA update server checks the operating conditions of the vehicle. If the vehicle's operating conditions permit the activation of the firmware update, then steps 1310, 1330, 1340, 1350, and 1360 are carried out. If the vehicle's operating conditions prohibit the activation of the firmware, update, then no steps are performed.

While many vehicles can report status conditions such as whether the engine is running, the battery is connected and has adequate voltage, the ignition is on, and the parking brake is engaged, some older vehicles cannot. In this case, it may be adequate to rely on the vehicle operator to check the conditions and confirm. Requesting that the operator of the vehicle confirm before the firmware update is complete and the newly downloaded firmware is activated may be a regulatory requirement in some jurisdictions. In order to guard against the vehicle operator confirming without checking, it is preferred that the vehicle operator is in close proximity to the vehicle.

Figure 14:
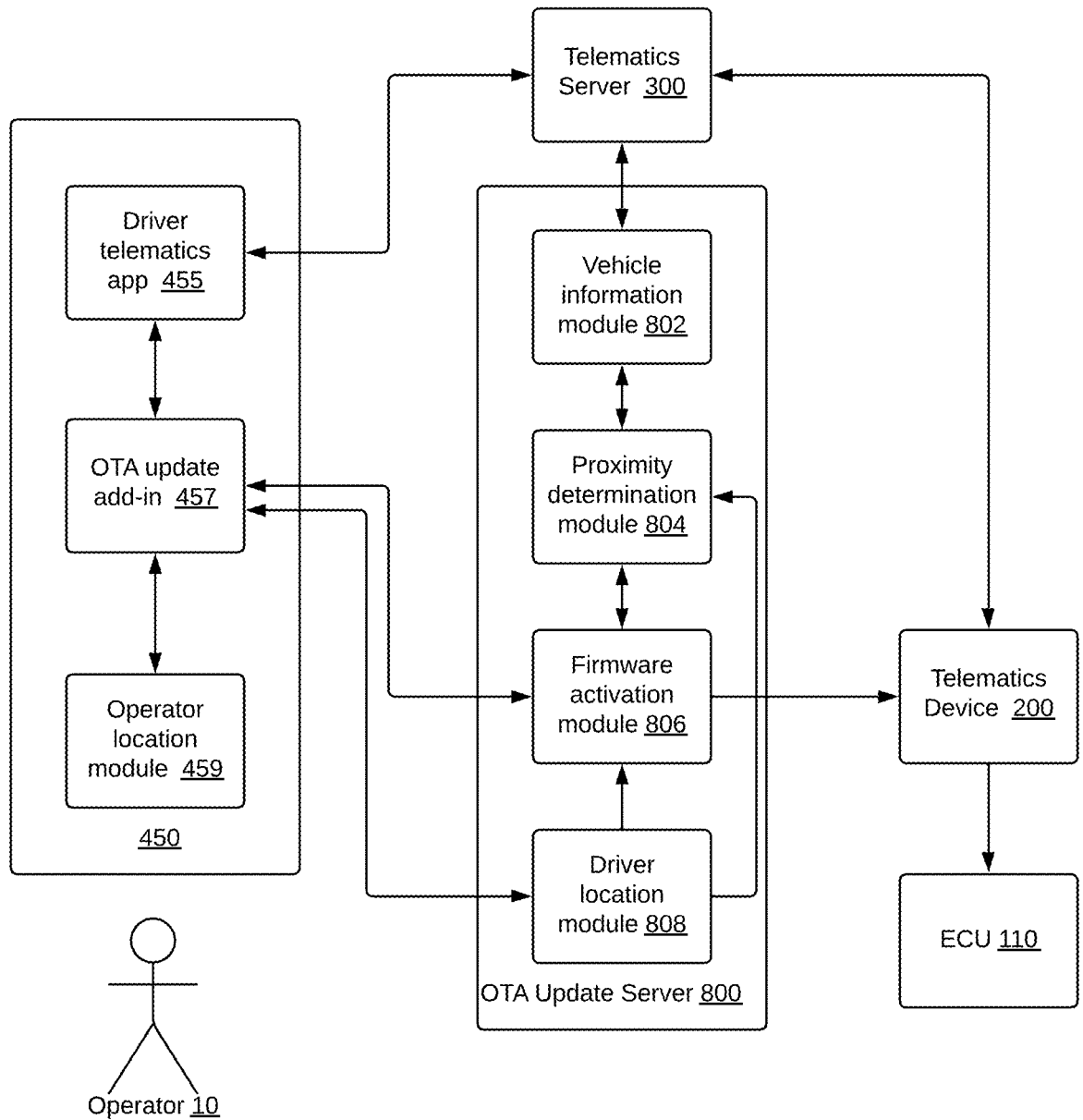
FIG. 14 is a simplified block diagram of system components that carry out an activation method for an ECU firmware update, in accordance with embodiments of the present disclosure.

FIG. 14 depicts a simplified block diagram showing selected components of an operator terminal 450, a telematics device 200, a telematics server 300, and an OTA update server 800, in accordance with embodiments of the present disclosure which verifies that the operator of a vehicle is in proximity therewith before asking the operator to authorize a firmware update completion. The depicted system may be used to allow an operator to confirm a firmware update in case of an ECU such as that of FIG. 4A wherein the firmware update is activated upon download. The depicted system may also be used to allow an operator to confirm an activation of an already downloaded firmware update, such as the case with ECUs of the type shown in FIG. 4B.

The operator terminal 450 is used by the operator 10 of a vehicle asset 100. The operator terminal 450 may be a smartphone or tablet. In the depicted embodiment, the operator terminal 450 runs a driver telematics application 455, which also has an OTA update add-in 457 in communication with an operator location module 459 as discussed below.

The driver telematics application 455 is a mobile application in communication with the telematics server 300 over a network such as the network 50 of FIG. 1. The driver telematics application 455 is typically used to associate an operator 10 with a vehicle asset 100 and keep track of the operator's use of the vehicle. Upon starting the driver telematics application, the operator is prompted to enter the vehicle they will be operating. Then as the operator is using the vehicle, various activities are tracked. For example, the driver telematics application 455 logs when the operator is on the move, taking a break, or using the vehicle for a personal trip. The logged information about the operator and the vehicle is uploaded to the telematics server 300.

The operator location module 459 is a software component for determining location information about the operator terminal 450.

In one embodiment, the operator location module 459 is coupled to a GPS module and reports an absolute location of the operator terminal 450.

In another embodiment, the operator location module 459 may indicate whether the operator terminal 450 is in close proximity to a telematics device 200 based on the connection status between the operator terminal 450 and a connectivity/communications module on the telematics device 200. For example, with reference to FIG. 2, the telematics device 200 may include an NFC module 260, a short-range wireless communication module 270, or a serial communications module 280. The operator location module 459 may indicate that the operator terminal 450 is in close proximity to the telematics device 200 (and hence the vehicle connected to the telematics device 200) if the operator terminal 450 is paired with the short-range wireless communications module 270 or is connected to the serial communications module 280. Additionally, the operator location module 459 may indicate that the operator terminal 450 is in close proximity to the telematics device 200 (and hence the vehicle) if the NFC module 260 has been tagged within a prior period of time. For example, if the operator (driver) of the vehicle taps the NFC module 260 on the telematics device 200 with an NFC tag, it is known that the operator is in the vehicle. Within a few seconds of the tap, the operator cannot have moved very far from the vehicle. For example, the operator location module 459 may report that the operator is in close proximity to the vehicle, if the NFC module 260 reports an NFC tap within the prior 30 seconds.

In yet another embodiment, the operator location module 459 may indicate whether the operator terminal 450 is in close proximity to a telematics device 200 based on the connection status between the operator terminal 450 and a connectivity/communications module on an I/O expander such as the I/O expander 500 of FIG. 3 which is connected to the telematics device 200. The operator location module 459 may indicate that the operator terminal 450 has the same location as the telematics device 200 if the operator terminal 450 is paired with the short-range communications module 570 or is connected to the serial communications module 580 of the I/O expander 500 which is connected to the telematics device 200.

The OTA update add-in 457 is an additional module such as a plug-in that is coupled to the driver telematics application for extending the function of the driver telematics application to support firmware update activation. in connection with the operator location module 459 deployed in the operator terminal 450 and receives the location information provided by the operator location module 459. The OTA update add-in 457 is also in communication with the OTA update server 800, via a network, and sends the location information obtained from the operator location module 459 to the OTA update server 800 upon receiving a request for the driver location information from the OTA update server 800. Additionally, the OTA update add-in 457 displays a firmware activation confirmation user interface on a display of the operator terminal 450 for receiving confirmation from the operator 10 that an ECU firmware activation may proceed as will be described in detail below. Furthermore, the OTA update add-in 457 sends an indication to the OTA update server 800 when an operator has confirmed that the ECU firmware activation may proceed.

The telematics device 200 of FIG. 14 is similar to the telematics devices described with reference to FIG. 2 and FIG. 3. In the context of FIG. 14, the telematics device 200 reports the location of the vehicle as part of the telematics data 212 sent to the telematics server 300. The telematics device 200 also sends a command to activate the firmware update in response to receiving a command from the OTA update server 800 as described above.

Figure 15:
FIG. 15 is an example database table in the telematics database correlating an asset, a telematics device, and the location thereof in accordance with embodiments of the present disclosure.

The telematics server 300 receives telematics data 212 from the telematics device 200, the telematics data 212 including the identity and location of the telematics device 200 coupled to the vehicle asset, which therefore indicates the location of the vehicle asset 100. The telematics server 300 stores the vehicle identification and vehicle location in the telematics database 310. For example, table 330 in FIG. 15 shows a few exemplary entries of vehicle assets having a vehicle identifier field 322 containing a vehicle identifier such as a VIN, the telematics device identifier 324 of the telematics device 200 coupled to each asset, and the asset location 326 that is the location of the telematics device 200 coupled to each asset. For example, the vehicle identified by the vehicle identifier 322 has a telematics device identified by the telematics device identifier TD0010 coupled thereto, and is located at the latitude/longitude location of 45.5017° N, 73.5673° W.

The telematics server 300 also receives from the driver telematics application 455, an association between the operator 10 and the vehicle asset 100. For example, when the operator 10 starts the driver telematics application 455 and selects a particular vehicle, such as by entering the vehicle's VIN, the driver telematics application 455 sends an association between the operator 10 and the vehicle asset 100 to the telematics server. The vehicle's operator 10 may be identified by the operator terminal 450 that they are using. The telematics server 300 may save the association between the vehicle asset and the operator terminal 450 in a table 340 in the telematics database 310, as shown in FIG. 16. The vehicle identifier field 322 may contain the vehicle's VIN as discussed above. The operator terminal 450 may be identified by the operator terminal's network address, an international mobile subscriber identity (IMSI), or any other identifier that uniquely identifies the operator terminal 450 and makes it possible for an entity to communicate therewith. As an example, the vehicle identified by "VIN1" is currently driven by an operator using an operator terminal 450 having the identity "OT0012".

Figure 17:
FIG. 17 is an asset information record sent by the telematics server to the OTA update server, in accordance with embodiments of the present disclosure.

The telematics server 300, may receive requests from a server, such as the OTA update server 800 for information about a vehicle asset including the driver identification and the vehicle location. The telematics server 300 may correlate the information from the tables 330 and 340 to provide the requested information. For example, with reference to FIG. 17, the telematics server 300 may send the shown asset information record 350 to the OTA update server 800 in response to a request from the OTA update server 800 for information about the vehicle identified by "VIN1". The asset information record for "VIN1" indicates that the telematics device identifier 324 is TD00101, the asset location 326 is "45.5017° N, 73.5673° W", and that the operator terminal 450 for the operator currently using the vehicle "VIN1" is "OT0012".

The OTA update server 800 contains a vehicle information module 802, a proximity determination module 804, a firmware activation module 806, and a driver location module 808.

The vehicle information module 802 requests information about a particular vehicle, identified by an asset ID, from the telematics server 300. The vehicle information module 802 receives an asset information record 350 from the telematics server 300 as discussed above. The vehicle information module 802 saves the asset information record 350. For example, the vehicle information module 802 may save the asset information record in the OTA update database 810.

The driver location module 808 requests the operator location from the OTA update add-in 457. As discussed above, the OTA update add-in 457 obtains the location of the operator terminal 450 from the operator location module 459. The driver location module 808 requests and receives the operator location, which is the location of the operator terminal from the OTA update add-in 457. The driver location module 808 may forward the operator location to either the firmware activation module 806 or to the proximity determination module 804 depending on the nature of the operator location. For example, if the operator location is comprised of an absolute location as reported by a GPS device, then the driver location module 808 forwards the operator location to the proximity determination module 804. On the other hand, if the driver location received from the OTA update add-in 457 indicates that the driver is in proximity with the vehicle (as a result of the operator terminal 450 being paired or connected to the telematics device 200 coupled to the vehicle), then the driver location is forwarded to the firmware activation module 806.

The proximity determination module 804 compares the asset location 326 received from the telematics server 300 for a particular vehicle with the absolute location of the driver received from the driver location module 808. The proximity determination module 804 concludes that the driver is in close proximity to the vehicle if the distance between the driver's location and the vehicle's location is below a particular threshold. For example, the particular threshold may be 10 meters and if the driver's location is within 10 meters of the vehicle's location, then the driver is considered in close proximity to the vehicle. The proximity determination module 804 provides an indication of the operator's proximity to the vehicle to the firmware activation module 806.

The firmware activation module 806 determines whether an update to an ECU firmware on a particular vehicle may be completed. In some embodiments, the ECU firmware update may be completed by sending the update to a telematics device 200 for download and activation on an ECU of the type shown in FIG. 4A. In other embodiments, the ECU firmware update is completed by the activation of a firmware update that is residing as a secondary firmware 128 in ECUs of the type shown in FIG. 4B. The firmware activation module 806 ensures that the driver is in close proximity to the vehicle before proceeding with completing a firmware update. The firmware activation module 806 may receive an indication that the driver is in close proximity to the vehicle from the driver location module 808 in case the driver's operator terminal 450 is connected to or paired with the telematics device or an I/O expander thereof coupled to the vehicle. The firmware activation module 806 may, alternatively, receive an indication that the driver is in close proximity to the vehicle from the proximity determination module 804. The firmware activation module 806 sends an indication to the OTA update add-in 457 on an operator's terminal 450 indicating that an ECU firmware update needs an operator's approval to proceed. In response to receiving an indication from the OTA update add-in 457 that an ECU firmware activation may proceed, the firmware activation module 806 either sends a firmware update or sends a message to the telematics device 200 indicating that the ECU firmware may be activated.

Figure 18:
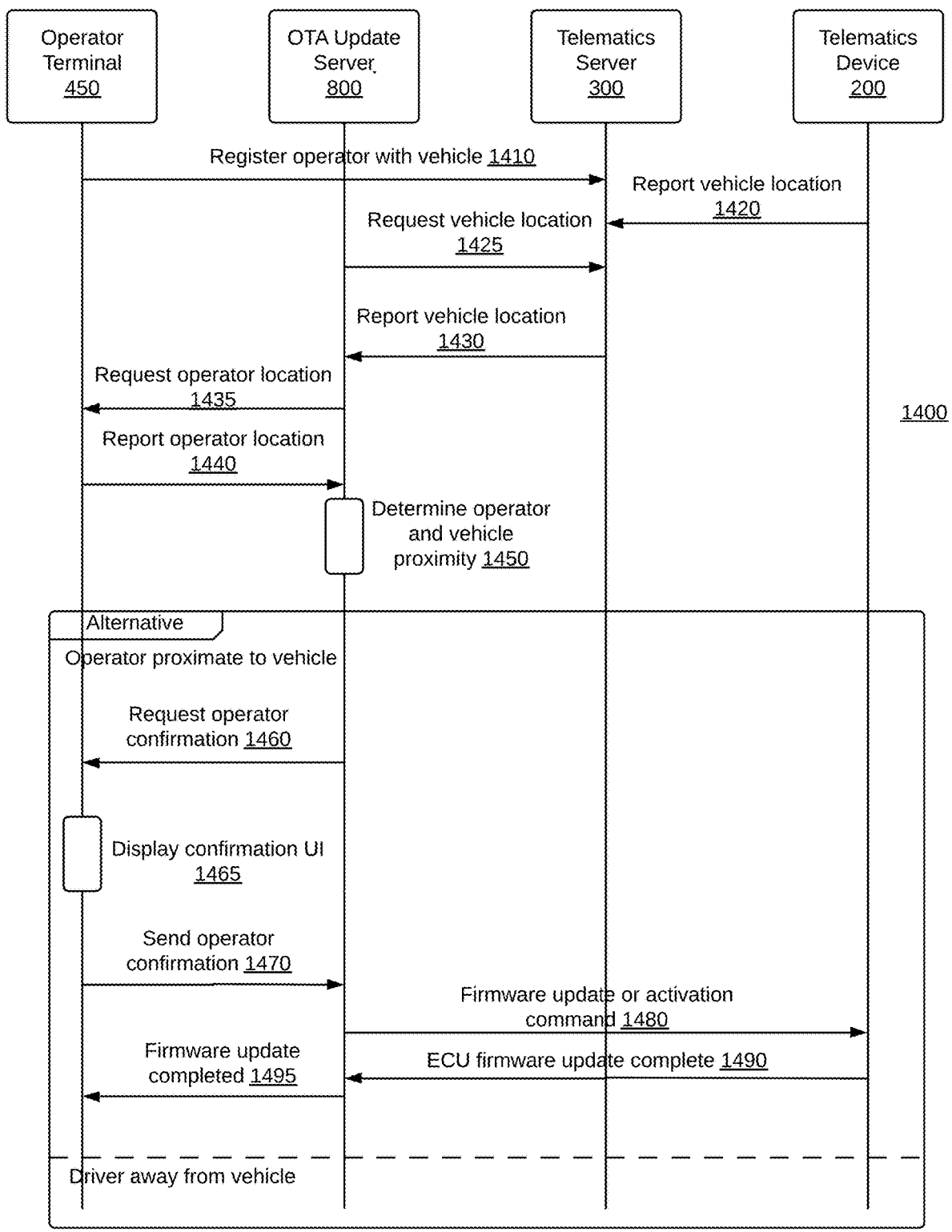
FIG. 18 is a sequence diagram depicting an activation method for an ECU firmware update, in accordance with other embodiments of the present disclosure.

The components depicted in FIG. 14 thus cooperate to provide an activation to an ECU firmware update. FIG. 18 depicts a sequence diagram for a method 1400 of activating an ECU firmware update, in accordance with embodiments of the present disclosure.

At step 1410, the operator terminal 450 registers an operator with a vehicle. As discussed above, the operator may use a driver telematics application to select a vehicle to operate. In the step 1410, the operator terminal 450 sends both an operator terminal identifier and a vehicle identifier to the telematics server 300. In response to receiving the registration of the operator with the vehicle, the telematics server 300 creates an association, such as an entry in a database table, associating the operator identifier with the vehicle identifier.

At step 1420, the telematics device 200 reports the location of the vehicle asset to which it is coupled to the telematics server 300. Since the telematics device 200 is typically coupled to the interface port 102 of the vehicle, the location of the telematics device 200, as reported by an on-board location module or a location module disposed in an I/O expander indicates the location of the vehicle asset. The telematics server 300 receives the location of the vehicle and the vehicle identifier (as reported by the vehicle to the telematics device in the form of a VIN) from the telematics device 200 and notes the location of the vehicle in a database entry in a table of the telematics database 310. It should be noted that the step 1420 may take place periodically and is not dependent on step 1410.

At step 1425, the OTA update server 800 requests the vehicle location for a particular vehicle for which an ECU update has been performed but for which the update has not yet been activated. The OTA update server 800 provides a vehicle identifier, such as a VIN, to the telematics server 300. The telematics server 300 locates the vehicle in the telematics database 310 and obtains the vehicle location.

At step 1430, the telematics server 300 sends the vehicle location to the OTA update server. The vehicle location is received by the OTA update server 800 and recorded in a database 810 of the OTA update server 800.

At step 1435, the OTA update server 800 requests the operator location from the operator terminal 450. The OTA update add-in 457 receives the request for the operator location.

At step 1440, the OTA update add-in 457 sends the operator location to the OTA update server 800.

At step 1450, the OTA update server 800 determines whether the operator and the vehicle are in proximity.

If the operator is proximate to the vehicle, then at step 1460, the OTA update server 800 sends a request for operator confirmation to the operator terminal 450.

At step 1465, and in response to receiving the request for operator confirmation, the OTA update add-in 457 displays a firmware update user interface (UI) including a confirmation UI prompting the operator to confirm that certain operating conditions are satisfied for the ECU firmware download and/or activation. An exemplary firmware update UI is depicted in FIGS. 20 to 24 and described below.

If the operator confirms that the ECU firmware update may proceed, then at step 1470, the OTA update add-in 457 sends an operator confirmation message to the OTA update server 800.

At step 1480, in response to receiving the operator confirmation, the OTA update server 800 sends a firmware update or a firmware activation command to the telematics device 200 coupled to the vehicle requiring the ECU firmware update. In response to receiving the firmware update or firmware activation command, the telematics device may check the vehicle condition as was done in step 1320 of FIG. 13. This step is not shown as it is assumed that the operator has confirmed that the conditions are met. However, in some embodiments, the step 1320 of checking the vehicle conditions may be carried out in response to receiving the firmware activation command at step 1480. In some embodiments, checking the vehicle conditions may be done by the telematics device 200, as was the case in FIG. 13A. In other embodiments, checking the vehicle conditions may be performed by the OTA update server 800, as shown in FIG. 13B.

At step 1490, the telematics device 200 sends an ECU firmware update complete indication to the OTA update server 800.

At step 1495, the OTA update server 800 sends an indication to the operator terminal 450 indicating that the ECU firmware update is now complete. The OTA update add-in 457 may update the firmware update UI displayed in step 1465 above to indicate that the firmware update has been completed. This is shown with some detail in FIGS. 20A through 20E.

In some embodiments, the method 1400 depicted in FIG. 18 includes additional steps. For example, prior to step 1460, the OTA update server 800 may obtain the vehicle's operating conditions from the telematics device 200 and include it with the request for operator confirmation of step 1460. In this embodiment, the firmware update UI reflects the vehicle's operating conditions which were determined in an automated manner.

Figure 19:
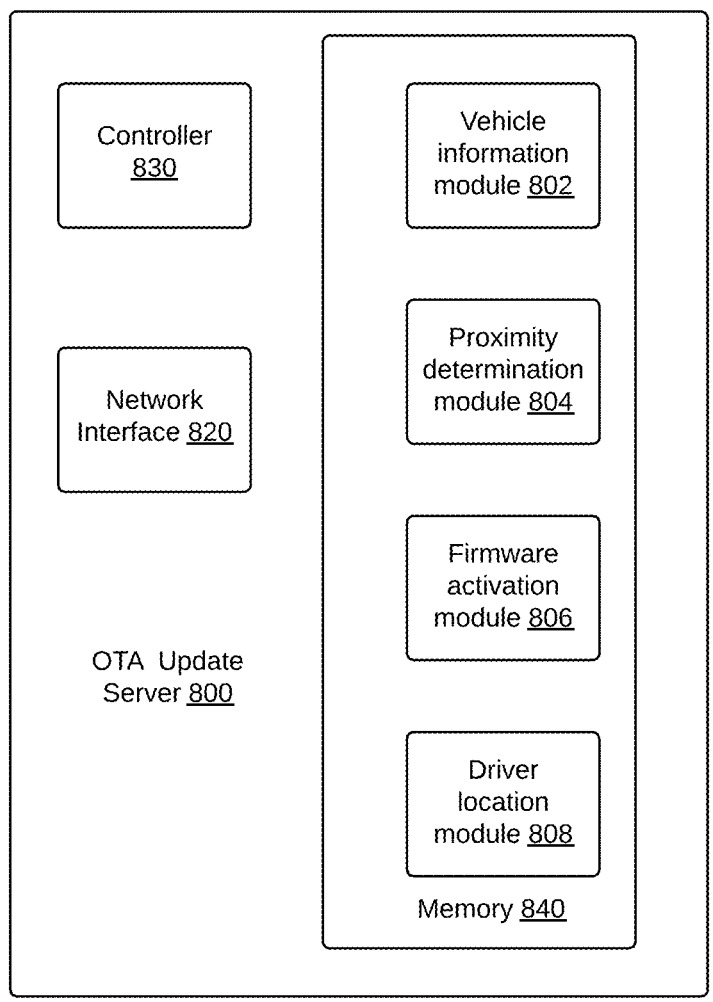
FIG. 19 is a block diagram of an OTA update server, in accordance with embodiments of the present disclosure.

FIG. 19 depicts a simplified block diagram of an OTA update server 800, in accordance with embodiments of the present disclosure. The OTA update server 800 is comprised of a controller 830, a memory 840, and a network interface 820.

The controller 830 is similar to the controller 230 described above.

The memory 840 stores machine-executable programming instructions which, when executed by the controller 830 perform the method steps performed by the OTA update server 800. Specifically, the machine-executable programming instructions comprise the vehicle information module 802, the proximity determination module 804, the firmware activation module 806 and the driver location module 808 all of which have been described above.

The network interface 820 is similar to the network interface 220 described above and enables the OTA update server 800 to communicate with the operator terminal 450, the telematics device 200, the telematics server 300, and the OEM server 900.

FIGS. 20-24 depict user firmware update user interfaces which are displayed by the OTA update add-in 457, in accordance with embodiments of the present disclosure.

Figure 20:
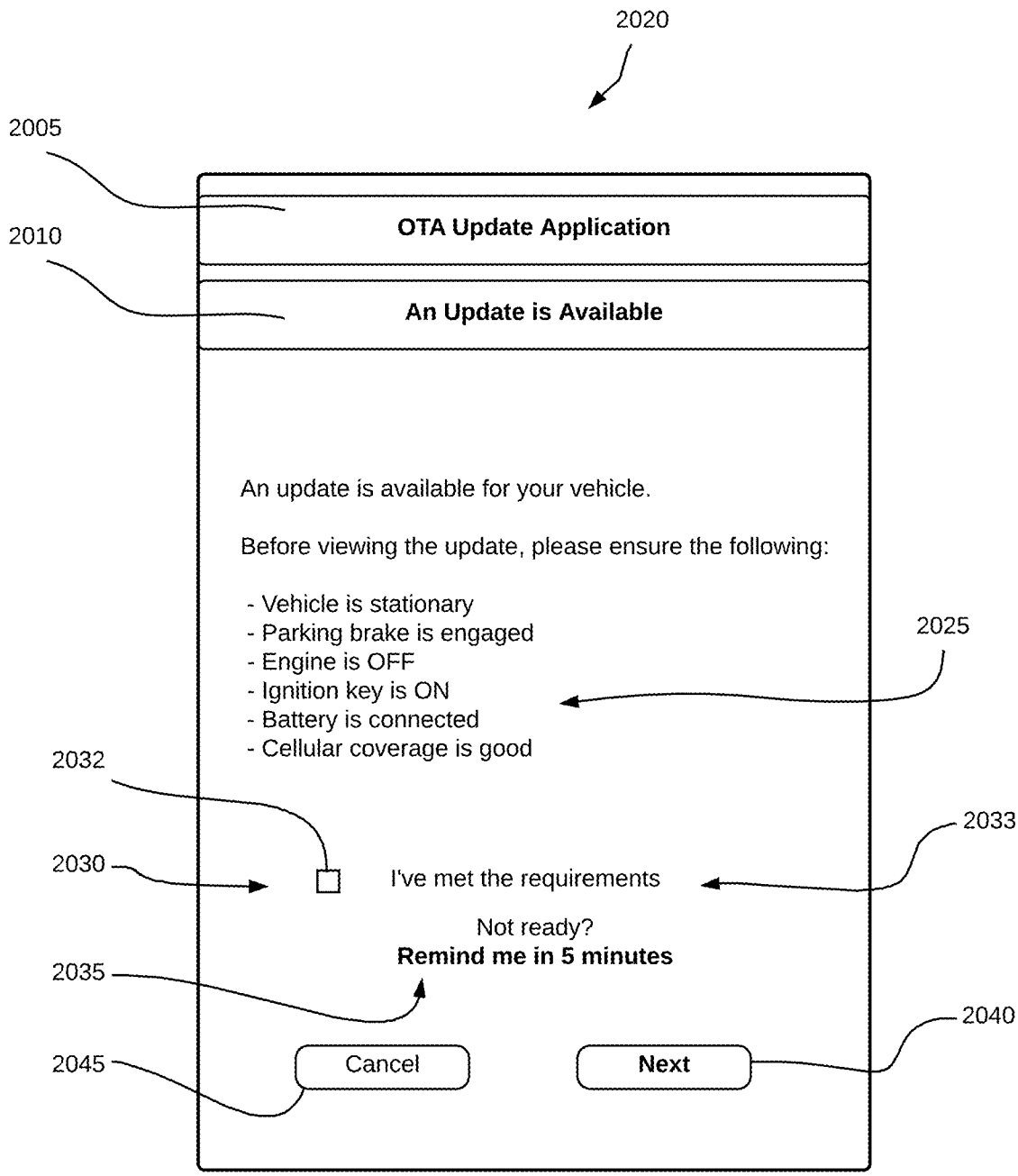
FIG. 20 depicts a firmware update user interface prompting an operator to check operating conditions and confirm, in accordance with embodiments of the present disclosure.

FIG. 20 depicts a UI 2020 including an indication of the availability of an ECU firmware update and listing the conditions that the operator of the vehicle needs to ensure are met before proceeding with the update, in accordance with embodiments of the present disclosure. The UI 2020 includes an application banner 2005, a UI banner 2010, an update conditions message 2025, a confirmation user interface element 2030, a deferment user interface element 2035, a next button 2040, and a cancel button 2045. The application banner 2005 indicates that the application currently running is the OTA update application. The UI banner 2010 includes a message indicating what the purpose of the currently displayed UI 2020. The UI banner 2010 displays a message indicating that an update is available for an ECU of the vehicle that the operator is currently operating. The update conditions message 2025 includes a list of the conditions that need to be met before the ECU firmware update may proceed. For example, the conditions shown include ensuring that the vehicle is stationary, that the parking bake is engaged, that the engine is off, that the ignition key is on, that the battery is connected, and that the cellular coverage is good. The confirmation user interface element 2030 is comprised of a confirmation message 2033 and a checkbox 2032. The deferment user interface element 2035 is comprised of a clickable message that may trigger an action. For example, clicking the deferment user interface element 2035 causes the UI 2020 to disappear and then be re-displayed at a later time. The next button 2040 may be used by the OTA update add-in 457 to advance to the next user interface where the OTA firmware update may proceed. Initially, the next button 2040 may be grayed out and disabled until the operator has confirmed that the requirements for the OTA firmware update are met. The cancel button 2045 allows permanent closing of the OTA update add-in 457.

The UI 2020 is displayed as shown. The operator may manually review the update conditions message 2025 and carry out whichever activities are necessary to comply with the conditions listed. When the operator is confident that the conditions listed in the update conditions message 2025 are satisfied, the operator may enable the confirmation user interface element 2030 by clicking the checkbox 2032. In response to detecting that the confirmation user interface element 2030 has been enabled, the OTA update add-in 457 updates the UI 2020 by enabling the next button 2040. At this point, the operator may then click the "Next" button 2040 to proceed. In response to detecting that the "Next" button has been clicked, the OTA update add-in 457 may send an operator confirmation as was described above with reference to step 1470 of FIG. 18. If the operator needs more time until the conditions listed in the update conditions message 2025 are complied with, then there are other options. If the operator believes the conditions may be complied with within a short duration, such as five minutes, then the operator may use the deferment user interface element 2035 to give the operator more time. For example, in response to actuating the deferment user interface element 2035, the OTA update add-in 457 causes the UI 2020 to disappear and then be re-displayed at a later time, such as after 5 minutes. If the operator believes that complying with the conditions listed in the update conditions message 2025 will take a long time to be satisfied, the operator may click the cancel button 2045 to abandon the update process and try again at a later time. In response to receiving an actuation of the cancel button 2045, the OTA update add-in 457 exits. The UI 2020 thus relies on the operator to confirm that operating conditions of the vehicle and instruct the OTA update add-in 457 to proceed with either downloading the update or activating the update if it had been already downloaded but not activated.

Figure 21:
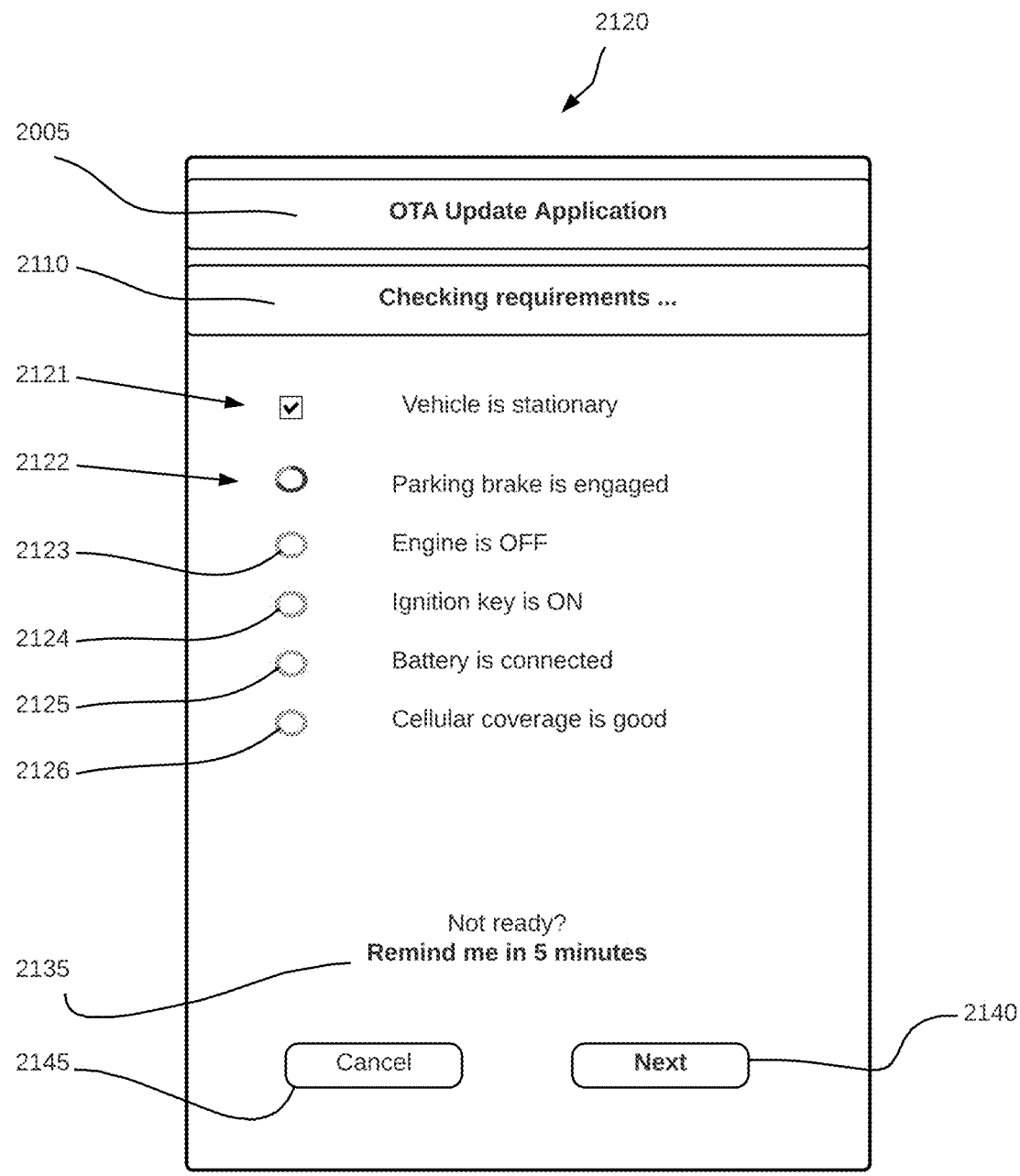
FIG. 21 depicts a firmware update user interface indicating that some operating conditions have not been met, in accordance with embodiments of the present disclosure.

FIG. 21 depicts a UI 2120 of the OTA update add-in 457 in which the vehicle operating conditions for a firmware update/activation are automatically checked, in accordance with embodiments of the present disclosure. The UI 2120 includes the application banner 2005, a UI banner 2110, a list of condition indication UI elements (2121 to 2126), a deferment user interface element 2135, a next button 2140, and a cancel button 2145.

The UI banner 2110 indicates that the requirements (or conditions) for proceeding with allowing a firmware update are being checked.

The condition indication UI elements 2121 to 2126 indicate each condition and the status thereof. If a condition is met, such as the condition 2121 that the vehicle is stationary, then a checkbox is displayed next thereto. If a condition is being tested and the status thereof has not yet been ascertained, then progress donut showing a partial progress is displayed as shown with the condition 2122. For conditions that have not been met yet, a progress donut indicating no progress is displayed as shown with the conditions 2123, 2124, 2125, and 2126.

The deferment user interface element 2135, the next button 2140, and the cancel button 2145 are similar to the deferment user interface element 2035, the next button 2040, and the cancel button 2045 discussed above with reference to FIG. 20.

In this embodiment, the OTA update add-in 457 may display the UI 2120 when The telematics device 200 may report to the OTA update add-in 457 the operating condition of the vehicle couped thereto, and the quality of the cellular connection of the telematics device 200. This may be via a direct connection between the operator terminal 450 and the telematics device 200, or by the OTA update add-in 457 querying the OTA update server 800 for the operating conditions of the vehicle to which the telematics device 200 is coupled, as shown above in steps 1302 and 1304 of FIG. 13B.

For example, as discussed above, the OTA update server 800 may obtain the vehicle's operating conditions and sends the vehicle's operating conditions with the request for operator confirmation in step 1460. As shown in FIG. 21, while the vehicle is stationary, the other operating conditions for an update are not met. Accordingly, the UI 2120 indicates to the user that the vehicle is not ready and provides an option for the user to retry after a period of time. For example, the operator may click the cancel button and go back to the previous UI.

Figure 22:
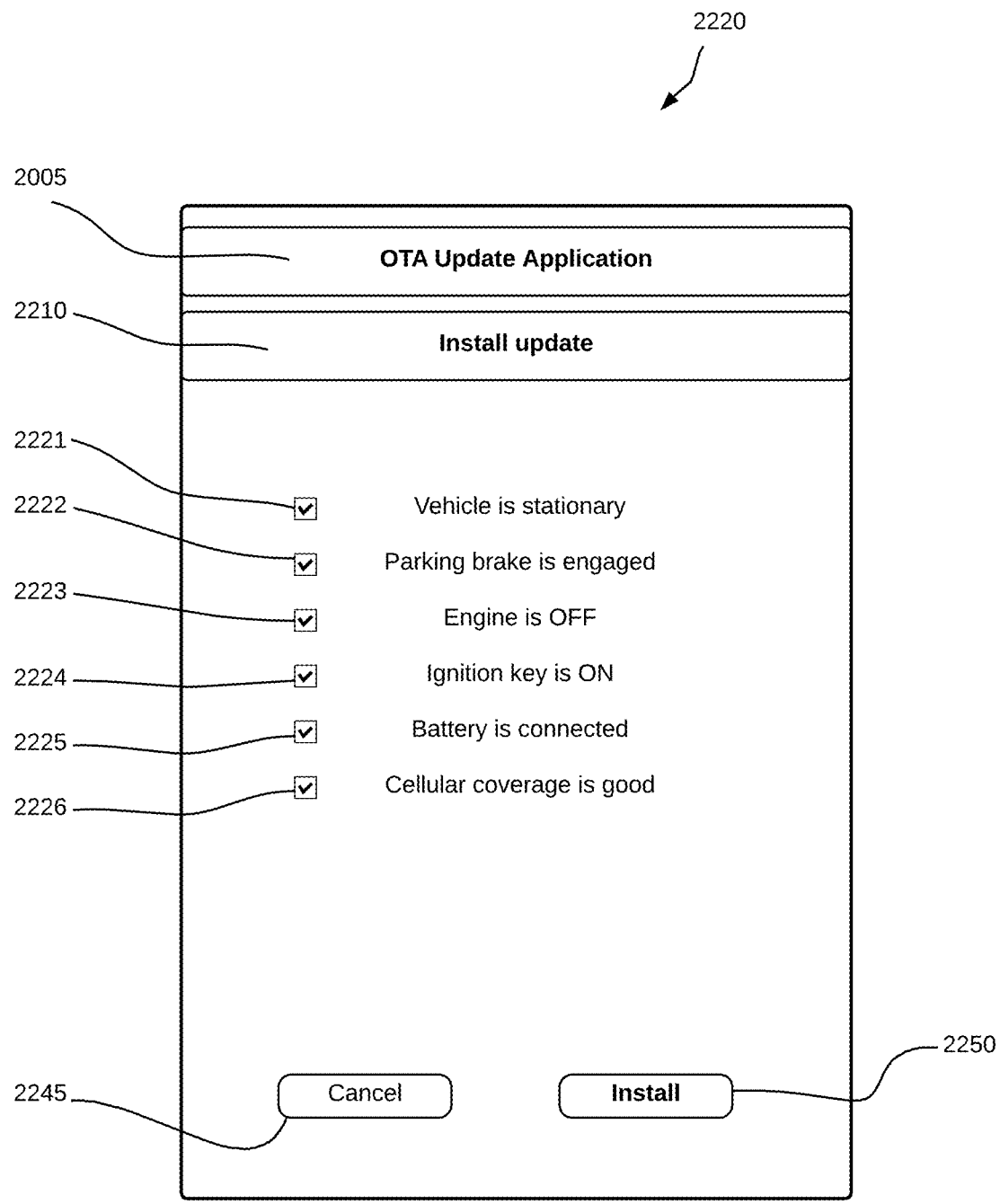
FIG. 22 depicts the firmware update user interface of FIG. 21, wherein all operating conditions for an update are met, in accordance with embodiments of the present disclosure.

FIG. 22 depicts a UI 2220 of the OTA update add-in 457 which indicates that all of the vehicle operating conditions required for completing a firmware update, are satisfied. The UI 2220 has an application banner 2005, UI banner 2210 and a list of operating conditions 2221, 2222, 2223, 2224, 2225 and 2226 ("2221 through 2226"). The UI 2220 also has an install button 2250 and a cancel button 2245. The UI banner 2210 indicates that an update may be installed. The update may be installed because all of the operating conditions of both the vehicle and the telematics device are appropriate for proceeding with the update. This is indicated by the fact that all of the operating conditions 2221 through 2226 have a checked checkbox as shown. In this case, actuating an install activation user interface element, such as the install button 2250 will cause the OTA update add-in 457 to send an operator confirmation to the OTA update server 800, as was described above in step 1470 of FIG. 18. In response to the operator confirmation, the OTA update server sends either a firmware update or a firmware activation command to the telematics device 200.

Figure 23:
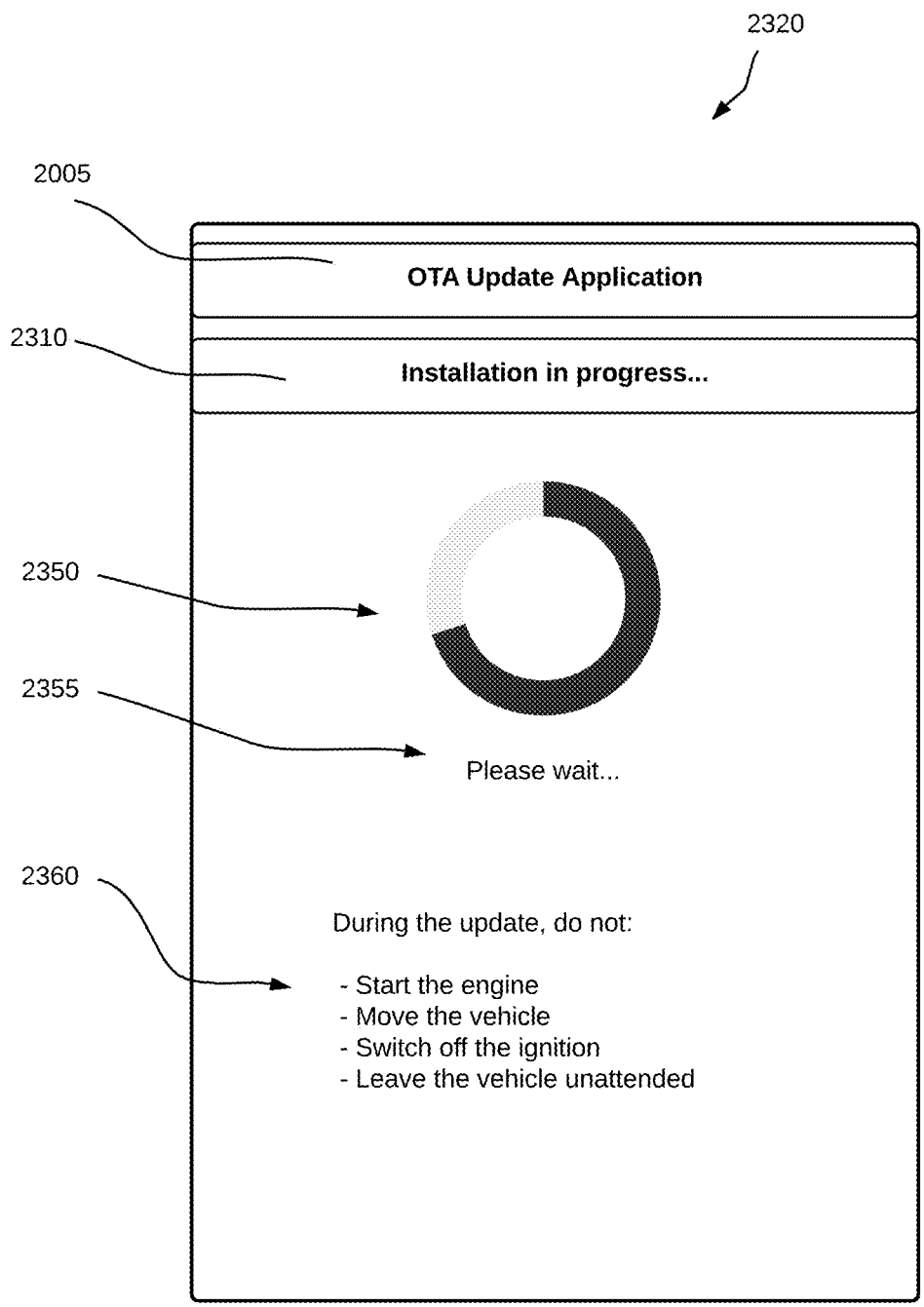
FIG. 23 depicts a firmware update progress user interface, in accordance with embodiments of the present disclosure.

FIG. 23 depicts a UI 2320 which provides status and instructions while the firmware update is in progress. The UI 2320 has an application banner 2005, a UI banner 2310, an installation progress indicator 2350, a wait message 2355, a list of forbidden tasks 2360. The UI banner indicates that the firmware installation to the ECU is in progress. The installation progress indicator 2350 shows the progress of the installation and is shown as a progress donut. The wait message 2355 tells the operator that they need to wait before operating the vehicle. The list of forbidden tasks 2360 is a list of tasks which if performed might jeopardize the update process and render the ECU unusable.

Figure 24:
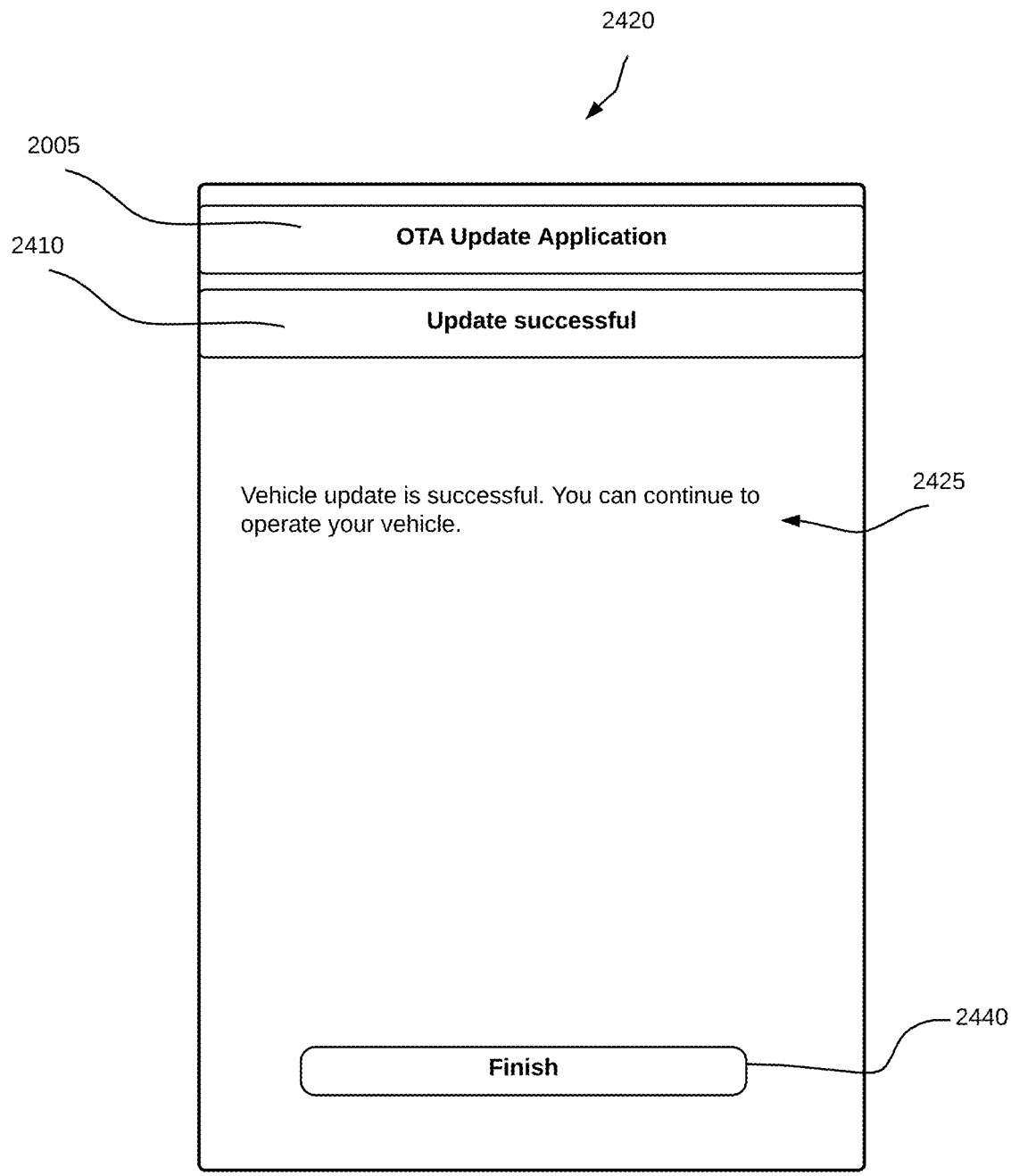
FIG. 24 depicts a firmware update completion user interface, in accordance with embodiments of the present disclosure.

FIG. 24 depicts a UI 2420 indicating that the firmware update is completed. The UI 2420 is displayed when the OTA update add-in 457 receives the firmware update completion message as in step 1495 of FIG. 18. The UI 2420 has an application banner 2005, a UI banner 2410, an update completion message 2425, and a finish button 2440. The UI banner 2410 indicates whether the update has been successful. The update completion message 2425 indicates to the operator that they may start using the vehicle. The finish button 2440 causes the OTA update add-in 457 to exit.

Figure 25:
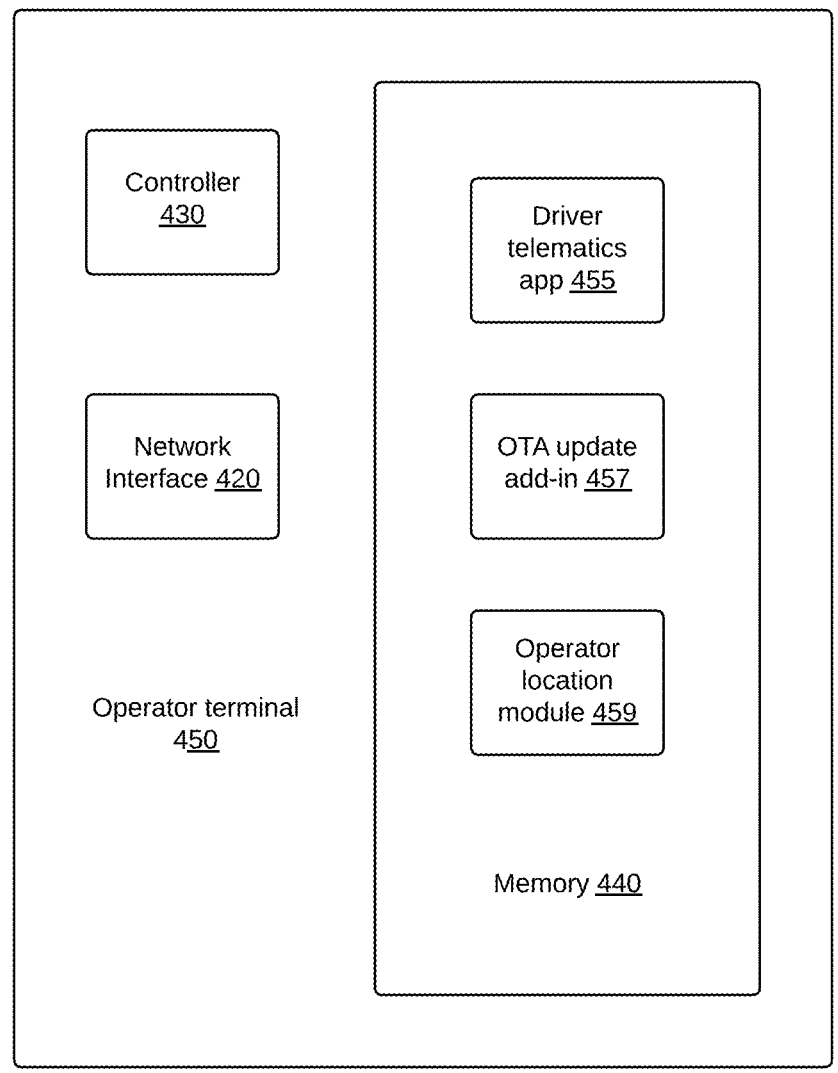
FIG. 25 is a block diagram of an operator terminal, in accordance with embodiments of the present disclosure.

FIG. 25 depicts a block diagram of an operator terminal 450, in accordance with some embodiments of the present disclosure. The operator terminal 450 comprises a controller 430, a network interface 420 coupled to the controller 430, and a memory 440 coupled to the controller 430. The memory 440 stores machine-executable programming instructions which when executed by the controller 430 configures the operator terminal to carry out the methods described herein. Specifically, the memory 440 stores machine-executable programming instructions for a driver telematics application 455, an OTA update add-in 457, and an operator location module 459.

The methods described herein may be performed by machine-executable programming instructions stored in non-transitory computer-readable medium and executable by a controller.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method by an over-the-air (OTA) update server, the method comprising:
receiving a firmware update request from an Original Equipment Manufacturer (OEM) server including a firmware update and a list of vehicle identifiers;
determining whether an operator terminal is in close proximity to a vehicle;
in response to determining that the operator terminal is in close proximity to the vehicle, sending a request to the operator terminal requesting a confirmation for proceeding with completing a firmware update for an electronic control unit (ECU) deployed on the vehicle; and
in response to receiving the confirmation for proceeding with completing the firmware update, sending a request to a telematics device coupled to the vehicle to complete the firmware update.

2. The method of claim 1, wherein completing a firmware update comprises sending a firmware update to an ECU, and wherein the firmware update becomes a primary firmware of the ECU after being downloaded thereto.

3. The method of claim 1, wherein completing a firmware update comprises sending a firmware activation command to an ECU, and wherein the firmware activation command causes a secondary firmware on the ECU to start executing.

4. The method of claim 1, wherein determining that the operator terminal is in close proximity to the vehicle comprises determining that a distance between a location of the vehicle and a location of the operator terminal is below a particular threshold.

5. The method of claim 4, further comprising receiving the location of the vehicle from a telematics server and receiving the location of the operator terminal from the operator terminal.

6. The method of claim 1, wherein determining that the operator terminal is in close proximity to the vehicle comprises receiving an indication from the operator terminal that the operator terminal is connected with the telematics device coupled to the vehicle.

7. The method of claim 6, wherein the operator terminal is connected with the telematics device via a wired communications module or a wireless communications module.

8. The method of claim 1, wherein determining that the operator terminal is in close proximity to the vehicle comprises receiving an indication from the operator terminal of a near-field communications (NFC) tap within a prior period of time.

9. The method of claim 1, further comprising:
sending the firmware update to the telematics device.

10. An over-the-air update server, comprising:
a controller;
a network interface coupled to the controller; and
a memory coupled to the controller, the memory storing machine-executable programming instructions which, when executed by the controller, configure the over-the-air (OTA) update server to:
receive a firmware update request from an Original Equipment Manufacturer (OEM) server including a firmware update and a list of vehicle identifiers;
determine whether an operator terminal is in close proximity to a vehicle;
in response to determining that the operator terminal is in close proximity to the vehicle, send a request to the operator terminal requesting a confirmation for proceeding with activating a firmware update on the vehicle; and
in response to receiving the confirmation for proceeding with activating the firmware update, send a firmware activation command to a telematics device coupled to the vehicle.

11. The over-the-air update server of claim 10, wherein the machine-executable programming instructions which configure the OTA update server to determine whether an operator terminal is in close proximity to a vehicle comprise machine-executable instructions which configure the OTA update server to determine that a distance between a location of the vehicle and a location of the operator terminal is below a particular threshold.

12. The over-the-air update server of claim 11, wherein the machine-executable programming instructions further configure the OTA update server to receive the location of the vehicle from a telematics server and receive the location of the operator terminal from the operator terminal.

13. The over-the-air update server of claim 10, wherein the machine-executable programming instructions which configure the OTA update server to determine that the operator terminal is in close proximity to the vehicle comprise machine-executable programming instructions which receive an indication from the operator terminal that the operator terminal is connected with the telematics device coupled to the vehicle.

14. The over-the-air update server of claim 13, wherein the operator terminal is connected with the telematics device via a wired communications module or a wireless communications module.

15. The over-the-air update server of claim 10, wherein the machine-executable programming instructions which configure the OTA update server to determine that the operator terminal is in close proximity to the vehicle comprise machine-executable programming instructions which receive an indication from the operator terminal of a near-field communications (NFC) tap within a prior period of time.

16. The over-the-air update server of claim 10, wherein the machine-executable programming instructions further configure the OTA update server to:
  send the firmware update to the telematics device; and
  receive an indication of the firmware update download completion to the vehicle.

\* \* \* \* \*